United States Patent

Iwamoto et al.

[11] Patent Number: 5,552,494
[45] Date of Patent: Sep. 3, 1996

[54] QUALITY CONTROL METHOD FOR ABS-BASED RESIN AND MOLDING OF THE ABS-BASED RESIN

[75] Inventors: Mune Iwamoto; Akihiko Nakajima; Masato Takaku; Hisao Morita; Toshihiko Ando; Tomofumi Shirafuji; Mutsuko Uchida, all of Takaishi, Japan

[73] Assignee: Mitsui Toatsu Chemicals, Inc., Tokyo, Japan

[21] Appl. No.: 361,489

[22] Filed: Dec. 22, 1994

[30] Foreign Application Priority Data

| Dec. 27, 1993 | [JP] | Japan | 5-332396 |
| Dec. 27, 1993 | [JP] | Japan | 5-332398 |
| Dec. 27, 1993 | [JP] | Japan | 5-332399 |
| Dec. 27, 1993 | [JP] | Japan | 5-332400 |
| Apr. 20, 1994 | [JP] | Japan | 6-081429 |

[51] Int. Cl.⁶ .................. C08F 279/04; C08L 51/04
[52] U.S. Cl. .................. 525/316; 525/71; 525/314
[58] Field of Search .................. 525/316, 314, 525/71

[56] References Cited

U.S. PATENT DOCUMENTS

| 4,146,589 | 3/1979 | Dupre | 260/876 R |
| 4,182,854 | 1/1980 | Hozumi et al. | 528/500 |
| 4,640,959 | 2/1987 | Alle | 525/316 |
| 4,699,976 | 10/1987 | Matsubara | 528/501 |
| 4,954,571 | 9/1990 | Iwamoto | 525/205 |
| 4,972,024 | 11/1990 | Iwamoto | 525/314 |
| 5,145,903 | 9/1992 | Duncan | 524/437 |
| 5,414,045 | 5/1995 | Sue | 525/86 |
| 5,428,106 | 6/1995 | Schrader | 525/71 |

FOREIGN PATENT DOCUMENTS

| 103657 | 3/1984 | European Pat. Off. . |
| 352383 | 1/1990 | European Pat. Off. . |
| 46-41467 | 12/1971 | Japan . |
| 59-1519 | 1/1984 | Japan . |
| 63-241053 | 10/1988 | Japan . |

OTHER PUBLICATIONS

"ABS Resin", vol. 1, Chapter 3, Properties of ABS Resin, pp. 123–129 (1970).
"Plastic Age", vol. 39, Jan., pp. 136–140 (1993).

Primary Examiner—Vasu S. Jagannathan
Attorney, Agent, or Firm—Burns, Doane, Swecker & Mathis

[57] ABSTRACT

A molding of an ABS-based resin is described. Rubber particles located at a depth of 0.5–1.5 μm from a surface of the molding morphologically comprise at least the following two types of particles:

(1) A particles having an a/b ratio not greater than 1.5, wherein a and b represent a major axis and a minor axis, respectively, and (2) B particles having an a/b ratio not smaller than 5, wherein a and b have the same meanings as defined above when a section extending at the depth in parallel with the surface of the molding is observed in an electron micrograph taken by the ultrathin sectioning technique. Assuming that the total area of the rubber particles as observed in the electron micrograph is 100%, the total area of the A particles accounts for at least 10% and that of the B particles is in a range of 0.01–90%.

35 Claims, 1 Drawing Sheet

(UNIT : MM)

QUALITY CONTROL METHOD FOR ABS-BASED RESIN AND MOLDING OF THE ABS-BASED RESIN

BACKGROUND OF THE INVENTION a) Field of the Invention

This invention relates to a molding of an ABS-based resin and also to a method for controlling the quality of the ABS-resin. More specifically, this invention is concerned with a molding of an ABS-based resin, said molding having a particular morphology, and also with a method for controlling the quality of the ABS-based resin.

The term "molding" as used herein should be interpreted in such a broad sense that it may embrace therein not only molded products but also extruded or otherwise shaped products.

This invention also pertains to the provision of the following moldings made of an ABS-based resin and having the respective quality:

(A) an ABS-based resin molding with a surface having small unevenness in gloss and a high gloss;

(B) an ABS-based resin molding having small unevenness in falling weight impact strength, (C) an ABS-based resin molding having a surface of an excellent delustered appearance and small unevenness in delustering and equipped with high impact strength, and (D) an ABS-base resin molding having a surface of a uniform gloss characteristic (high gloss or delustered appearance) and of small position-dependent unevenness and equipped with high impact strength.

b) Description of the Related Art

ABS-based resin moldings have been employed widely as moldings for engineering and like applications, such as parts or components for electric appliances, electronic equipments, automotive vehicles and the like, for their excellent mechanical strength, heat resistance, chemical resistance, anti-torque strength upon tightening a screw, color tone, surface appearance and the like.

ABS resin is required to be available as polymers with properties varied to meet application purposes. Polymers even with totally opposite properties may be needed, for example, to provide moldings ranging from those having a high gloss to those delustered. It is also required to achieve various and stringent properties to assure, for example, high impact strength and prevention of position-dependent unevenness in gloss, delustered appearance and impact strength of moldings.

To achieve these, it is generally necessary to control physical properties by choosing or adjusting rather complex conditions such as the kind of a rubber component to be graft polymerized, its particle size and conditions for the graft polymerization. Under the current circumstances, however, it is still difficult to achieve high physical properties even if such conditions are chosen or adjusted as appropriately as possible.

These moldings are accompanied by various quality problems, because in the course of production of the moldings, it is difficult to mold and/or process the whole moldings under uniform conditions. Described specifically, the following problems can be mentioned:

(1) The gloss is insufficient or the surface of a molding is not uniform. With respect to the gloss characteristic, in particular, the gloss of a molding may vary depending on the position (this is called "uneven gloss") even if the molding as a whole has an excellent average gloss. As a material for moldings intended for use at positions where the moldings are visible from the outside, it has been required to improve this uneven gloss.

(2) The falling weight impact strength of a molding varies depending on the position (this is called "uneven falling weight impact strength"). As an industrial material, there is a need for an improvement in uneven falling weight impact strength.

(3) The delustered appearance of a molding is insufficient and moreover, there is substantial unevenness in delustering.

This uneven gloss will be described in further detail by taking by way of example a molding obtained by an injection molding machine. When a surface is formed in the course of injection molding, a gradient is developed in molding pressure between a position called a "gate portion", through which a molten polymer is fed into a mold, or its vicinity and each position located apart from the gate portion (namely, the end of each flow of the molten polymer through the mold) so that the resultant molding generally tends to have a lower gloss at end portions thereof.

Further, a practical molding has a very complex shape because of the provision of ribs or bosses for the retention of strength, mold-releasing jutting pins, and/or concave or convex portions for connection with other parts. The surface gloss of the molding therefore varies significantly depending on the position and is not uniform. Even if the molding as a whole has an excellent average gloss or a superb delustered appearance, its gloss or delustered appearance is not even locally so that the commercial value of a final product making use of the molding, for example, an electric appliance or the like is lowered.

Many methods have been proposed for improving the average surface gloss of an ABS-based resin molding. For resin compositions which comprise a rubber-modified styrene, methods for improving the balance between the average gloss value and the impact strength in each resin composition by blending, for example, a resin containing rubber particles of different particle sizes are disclosed inter alia in Japanese Patent Publication No. 41467/1971, Japanese Patent Laid-Open Nos. 1519/1984 and 241053/1988, and U.S. Pat. No. 4,146,589.

Japanese Patent Publication No. 41467/1971 referred to above discloses on page 1, right column, lines 27–31 a method for improving the balance between the average gloss value and the impact strength by blending a resin containing rubber particles of different particles, that is, rubber particles having a particle size of 0.05–0.5 µm and rubber particles having a particle size of 2–10 µm. This publication therefore discloses that incorporation of particles of different sizes is effective for the improvement of impact strength. No effective proposal is however made therein with respect to the theme that uneven gloss be reduced.

It has heretofore been attempted to eliminate such unevenness in gloss by devising molding conditions for the production of a molding or by modifying the design of a mold.

In recent years, there is an increasing demand for moldings with a delustered surface in the fields of interior components or parts for automotive vehicles, components or parts for home electric equipments and appliances, etc. Illustrative known methods which are commonly employed for delustering the surfaces of moldings include, as methods applied upon molding, the method in which gaining is applied to the surface of a mold and the method in which a liquid delustering agent is coated on the surface of a molding. These methods however require a special mold or a special operation. Also known is the method in which an inorganic filler such as talc, calcium carbonate or silica gel is added. To make the delustered surface appearance uniform, this method however requires the addition of the inorganic filler in a large quantity. However, this leads to a significant reduction in the impact strength and is not preferred.

To reduce such unevenness in gloss or delustered appearance, it has heretofore been the practice to cope with the problem by devising the molding conditions for a molding or devising the design of a mold on the basis of experience as described above. This approach however requires a substantial time and cost and in the case of the modification to the design of the molding, for example, the gloss may not be balanced with the strength and structure in many instances even if the unevenness gloss can be reduced as a consequence.

As methods for modifying a resin, blending methods are known. For example, Japanese Patent Laid-Open No. 142259/1979, Japanese Patent Publication No. 59725/1987, and the like can be mentioned in this respect. It is however impossible for these methods to eliminate uneven delustering without lowering other physical properties. Further, these blending methods cannot provide moldings of such a morphology as will be described subsequently herein.

It is known for many years that upon molding a resin, rubber particles are each deformed into an elliptical shape due to a stress developed inside the resin. Such a shape can be observed by electron microscope. This is disclosed, for example, in (1) "ABS Resin", Volume 1, Chapter 3: Properties of ABS Resin, page 126 (1970), Compiled by Kobunshi Kikai Zairyo Iinkai and (2) "Plastic Age", Volume 39, January, 139 (1993).

No study has however been made on the control of physical properties of a molding by relying upon the morphology of such rubber particles. In the molding disclosed in the above publication (1), all rubber particles have been similarly deformed in a somewhat flattened shape. In the molding disclosed in the above publication (2), rubber particles located within a certain distance from its surface have all been subjected to considerable deformation. In these conventional examples, the rubber particles have been deformed almost uniformly near the surface.

Uneven falling weight impact strength will next be described in detail, for example, in connection with a molding obtained by an injection molding machine. Upon formation of a surface by injection molding, the resin undergoes orientation. The resin is strongly oriented especially at each position in a mold, where the molten resin moved at a high flow rate. The falling weight impact strength of the portion so oriented tends to become lower compared with a portion corresponding to a position in the mold, where the molten resin moved at a low flow rate. In the case of a planar molding, for example, the falling weight impact strength tends to become lower as the point of measurement becomes closer to the position corresponding to a gate because the molten resin in the mold has a higher flow rate in the vicinity of the gate portion. Further, a practical molding has a very complex shape because of the provision of ribs or bosses for the retention of strength, mold-releasing jutting pins, and/or concave or convex portion for connection with other parts. Surface molding conditions of the molding therefore vary considerably depending on the position and moreover, the strength varies substantially. Even if a resin having, for example, a high Izod impact strength test value is used, the uneven falling weight impact strength formed upon molding and the existence of local portions having smaller strength cause problems. To increase the strength of such local portions, a measure has heretofore been taken to increase the content of a polycarbonate in the resulting resin where an ABS resin is blended with the polycarbonate. Many methods have heretofore been proposed to improve the average impact strength or an average falling weight strength. No effective method is, however, proposed for the elimination of the falling weight impact strength of the present invention.

With a view toward eliminating such uneven falling weight impact strength, certain measures have been taken including devising of molding conditions and modifications to the design of a mold and in the case of such a blend system as described above, blending of an expensive resin of high strength in a greater percentage. These methods are however difficult to overcome the above problem, because they require a substantial cost and in the case of the modification of the design of the mold, for example, the average gloss and the impact strength can hardly be balanced in many instances.

SUMMARY OF THE INVENTION

The present inventors have proceeded with an extensive investigation with a view toward eliminating uneven gloss, uneven delustering, uneven falling weight impact strength and the like. It has now surprisingly been found that various quality-related problems of ABS-based resins can be overcome by controlling the morphology of rubber particles in moldings into specific shapes instead of relying upon a conventional method such as the above-described modification to molding conditions, the design of a mold or the blend percentage, leading to the present invention.

Accordingly, an object of the present invention is to provide a molding of an ABS-based resin, said molding having specific rubber particles (morphology), and a method for controlling the quality of a molding of an ABS-based resin, such as its morphology, physical properties and the like, over a wide range by an extremely simple method.

The existence of B particles and A particles in combination, which makes up the basis of the present invention and will be described subsequently herein, was not known at all in the past.

In one aspect of the present invention, there is thus provided a molding of an ABS-based resin, wherein rubber particles located at a depth of 0.5–1.5 μm from a surface of the molding morphologically comprise at least the following two types of particles:

(1) A particles having an a/b ratio not greater than 1.5, wherein a and b represent a major axis and a minor axis, respectively, and (2) B particles having an a/b ratio not smaller than 5, wherein a and b have the same meanings as defined above when a section extending at the depth in parallel with the surface of the molding is observed in an electron micrograph taken by the ultrathin sectioning technique; and assuming that the total area of the rubber particles as observed in the electron micrograph is 100%, the total area of the A particles accounts for at least 10% and that of the B particles is in a range of 0.01–90%.

In another aspect of the present invention, there is also provided an ABS-based resin capable of affording a molding having A particles and B particles whose total areas fall within their respective ranges specified above.

It is to be noted that the term "ABS-based resin" as used herein embraces not only ABS resin but also resins containing ABS resin as a component such as polyblends of ABS resin and other resins.

It is preferred that when a section extending at a depth of at least 200 μm from the surface of the molding in parallel with the surface of the molding is observed in an electron micrograph taken by the ultrathin sectioning technique, the molding satisfies the following equations:

$$1 \times 10^{-4} \leq \alpha_s \leq 9$$

$$\alpha_m \leq 1 \times 10^{-2}$$

$$\alpha_m/\alpha_s \leq 5 \times 10^{-2}$$

wherein a. $\alpha_s$ is $X_1/Y_1$, $X_1$ and $Y_1$ being the percentages of the total areas of the B particles and the A particles, respectively, at the depth of 0.5–1.5 μm when the total area of all the rubber particles at the depth of 0.5–1.5 μm is assumed to be 100%, and b. $\alpha_m$ is $X_2/Y_2$, $X_2$ and $Y_2$ being the percentages of the total areas of B particles and A particles, respectively, at the depth of at least 200 μm when the total area of all the rubber particles at the depth of at least 200 μm is assumed to be 100%.

In a further aspect of the present invention, there is also provided a method for controlling the quality of an ABS-based resin, which comprises controlling the quality of the ABS-based resin to provide a molding wherein rubber particles located at a depth of 0.5–1.5 μm from a surface of the molding morphologically comprise at least the following two types of particles:

(1) A particles having an a/b ratio not greater than 1.5, wherein a and b represent a major axis and a minor axis, respectively, and (2) B particles having an a/b ratio not smaller than 5, wherein a and b have the same meanings as defined above when a section extending at the depth in parallel with the surface of the molding is observed in an electron micrograph taken by the ultrathin sectioning technique; and assuming that the total area of the rubber particles as observed in the electron micrograph is 100%, the total area of the A particles accounts for at least 10% and that of the B particles is in a range of 0.01–90%.

In the above quality-controlling method, it is preferred that upon production of an ABS-based resin by a solution or bulk polymerization process comprising (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component, the method comprises setting an outlet temperature of the recovery step in a range of 180°–300° C., and (1) causing the outlet temperature of the recovery step to fluctuate so that the multiplication product (F; hereinafter simply called "product") of a deviation (%) of the outlet temperature and the number of fluctuations of the outlet temperature per hour falls within a range of 0.5–150 or (2) blending at least two kinds of ABS-based resins, which have been obtained by causing the outlet temperature to fluctuate, so that the sum of the products of Fs and blend percentages× 1/100 of the individual ABS-based resins falls within the range of 0.5–150.

In a particularly preferred embodiment of the above quality-controlling method, the outlet temperature has a deviation of 1–15% and the number of fluctuations of the outlet temperature per hour is 11–33 times.

DESCRIPTION OF THE PREFERRED EMBODIMENTS

1. Production Process of ABS-based Resin

Figure 1A:
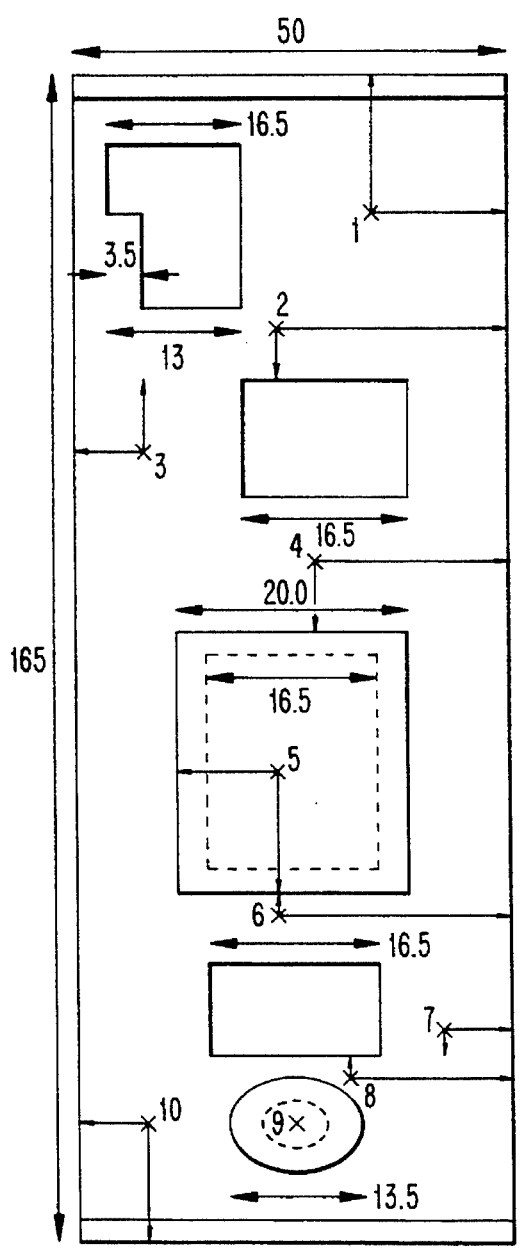
FIGS. 1A and 1B are a plan view and cross-sectional view of an injection molding, respectively, and illustrate positions where its gloss and falling weight impact strength were measured.

The term "ABS-based resin" as used herein means a resin which comprises a copolymer of a rubbery polymer, a styrene monomer and an acrylonitrile monomer and, if necessary, one or more other monomers. Illustrative of the styrene monomer include styrene, α-alkylmonovinylidene aromatic monomers (for example, α-methylstyrene, α-ethylstyrene, α-methylvinyltoluene and α-methyldialkylstyrenes), ring-substituted alkylstyrenes (for example, o-, m- and p-vinyltoluenes, o-ethylstyrene, p-ethylstyrene, 2,4-dimethylstyrene and p-tert.-butylstyrene), ring-substituted halostyrenes (for example, o-chlorostyrene, p-chlorostyrene, o-bromostyrene and 2,4-dichlorostyrene), ring-alkyl, ring-halogen-substituted styrenes (for example, 2 -chloro-4-methylstyrene and 2,6-dichlorostyrene), vinylnaphthalene, and vinylanthracene. They can be used either singly or in combination. Each alkyl substituent generally contains 1–4 carbon atoms and can be an isopropyl or isobutyl group.

Examples of the acrylonitrile monomer include acrylonitrile, methacrylonitrile, ethacrylonitrile and fumaronitrile, and mixtures thereof.

No particular limitation is imposed on the rubbery polymer insofar as it exhibits rubbery properties at room temperature. Preferred examples include polybutadienes such as conjugated 1,3-dienes (e.g., butadiene and isoprene), styrene-butadiene copolymers, and EPDMs (ethylene-propylene-diene-methylene linkages).

No-particular limitation is imposed on the term "monomer" as used herein insofar as it is a monomer copolymerizable with styrene and acrylonitrile. Exemplary monomers include acrylates such as methacrylate and maleimides such as N-phenylmaleimide and cyclohexylmaleimide.

The ABS-based resin useful in the practice of the present invention is either the ABS resin described above or a resin containing the ABS resin as a component. No particular limitation is imposed on the resin containing ABS resin as a component insofar as it contains ABS as a component. Illustrative examples include polyblends of ABS resin and other resins such as polycarbonates, polyphenylene ethers, polypropylene, polystyrene and acrylonitrile-styrene copolymers; mixtures of ABS resin and flame retardants or the like; mixtures of ABS resin and fillers such as glass filler and talc.

According to the present invention, blending of a polycarbonate, especially in a amount of 10–75 parts by weight per 100 parts by weight of the ABS-based resin makes it possible to obtain an ABS-based resin molding which is free of uneven gloss and has high heat resistance.

The term "molding of an ABS-based resin" as used herein means a molding which has been obtained by forming the ABS-based resin and is by itself usable as a final product, for example, as a mechanical part, stationery, toy, doll, game or the like owing to the mechanical and chemical characteristics of the ABS-based resin. The forming can be conducted using a usual resin forming method known to date, for example, injection molding or extrusion. As mentioned above, the present invention features to control the morphology of rubber particles in a layer located close to a molding.

The molding, extrusion or any other forming (hereinafter collectively called "molding") of the ABS-based resin according to the present invention is conducted under conditions commonly employed in the art. Taking injection molding, for example, it can be conducted at a cylinder temperature of 180°–280° C., preferably 200°–280° C. and at a mold temperature of 20°–90° C., preferably 40°–90° C.

2. Morphology of ABS-based Resin Molding of the Invention

In the present invention, rubber particles located near the surface of a molding must be contained in at least two types of shapes. Described specifically, the rubber particles contained at a depth of 0.5–1.5 µm from the surface of the molding must exist in at least two types of shapes.

The selection of 0.5–1.5 µm as the depth from the surface of the molding, that is, as a region where the morphology with which the present invention is concerned should be specified is based on our finding of the existence of a correlation between the inclusion of rubber particles of particular shapes at this depth and uneven surface gloss. It is also based on our finding that the shapes of rubber particles remain substantially constant irrespective of the depth in the range of 0.5 µm to 1.5 µm from the surface. Depths outside the above range are not suited for specifying the morphology of rubber particles in the ABS-based resin molding, because rubber particles have varied shapes at a depth shallower than 0.5 µm and the shapes of rubber particles have depth-dependency at a depth greater than 1.5 µm.

In the present invention, the morphology of rubber particles is determined in a section parallel to the surface of the molding. This parallel section can be obtained by slicing the molding into ultrathin slices with a microtome in parallel with the surface of the molding. At this time, the thickness of each sample to be sliced by the microtome is set at 0.05 µm. The molding is successively sliced from the surface thereof and the morphology is determined using the 11th to 30th samples.

The term "A particles" as used herein means rubber particles which in an electron micrograph of a sample of such a surface layer, have an a/b ratio of 1.5 or smaller when the major and minor axes of each rubber particle are assumed to be a µm and b µm, respectively. "B particles" are those having an a/b ratio of 5 or greater.

The term "major axis a" as used herein means the maximum length of a distance between two points on a periphery of each rubber particle as observed in an electron micrograph taken by the ultrathin sectioning technique. Likewise, the term "minor axis b" indicates the length of the rubber particle, which extends at a right angle relative to the major axis a through a midpoint (a/2) of the major axis. Upon calculation of the areas of each A and B particles under such specific conditions, the size of a field of vision which is supposed to be observed under an electron microscope is set so that the total area becomes 1,000 µm$^2$ or greater. Although no particular numerical limitation is imposed on the field of vision of the electron microscope, the field of vision can have such a size as containing 1,000 or more rubber particles. The method of the present invention controls the contents of these two types particles, that is, A particles and B particles, whereby physical properties of the molding are controlled.

The term "average rubber particle size of A particles" as used herein means a value which is determined in a manner to be described next. Among rubber particles observed in the electron micrograph taken by the ultrathin sectioning technique, about 500–700 particles of A particles are measured to determine their major and minor axes. With respect to each of the rubber particles so measured, the arithmetic mean of its major and minor axes is called a "rubber particle size $D_1$," here. The average rubber particle size is then determined in accordance with the following formula:

Rubber particle size $$D_1 = (a_1 + b_1)/2$$

(an arithmetic mean of a major axis a and a minor axis b of a given particle)

Average rubber particle size $$= \sum_{i=0}^{k} n_i D_i^4 / \sum_{i=0}^{k} n_i D_i^3$$

The molding according to the present invention has the morphology that the total area of A particles accounts for at least 10% and that of the B particles is in a range of 0.01–90%.

By controlling the morphology in terms A particles and B particles, the quality controlling method according to the present invention can provide the following four types of ABS-based resins:

(A) ABS-based resin capable of affording moldings having high gloss with small unevenness, (B) ABS-based resin capable of affording moldings having small unevenness in falling weight impact strength, (C) ABS-based resin capable of affording moldings having good delustered appearance with small unevenness, and (D) ABS-based resin capable of affording moldings uniform gloss characteristics (high gloss or delustered appearance) with small position-dependent variations on their surfaces and high impact strength.

In a molding obtained from the resin (A), the total area of A particles is preferably 10–99%, with 10–80% being preferred. Percentages smaller than 10% are not preferred, because they cause not only uneven gloss but also variations in apparent color hue due to the influence of rubber particles oriented-in the surface of the molding.

The average rubber particle size of the A particles is preferably 0.1–1.5 µm, more preferably 0.3–1.3 µm, and most preferably 0.3–0.8 µm. Average rubber particle sizes greater than 1.5 µm lead to insufficient gloss, whereas average rubber particle sizes smaller than 0.1 µm result in a reduction in strength. Average rubber particle sizes outside the above range are therefore not preferred.

It is preferred that, when observed in an electron micrograph taken by the ultrathin sectioning technique, the average rubber particle size of the A particles is in a range of 0.1–1.0 µm and assuming the area of all the rubber particles is 100%, the A particles whose rubber particle sizes fall within a range of 1.0–1.5 µm account preferably for 0.5–5.0%, more preferably for 0.5–3.0%, most preferably for 0.5–1.5%. When these ranges are met, it is possible to obtain a molding having high gloss with small unevenness and also high strength. The total area of B particles is desirably in a range of 0.01–1.0%. Lack of B particles causes uneven gloss and is hence not preferred.

The present invention can provide an ABS-based resin, which can in turn provide a molding in which the total area of B particles is in a range of 0.01–1.0% and the average particle size of A particles is in a range of 0.1–1.5 µm.

Resin moldings according to the present invention have high gloss and are free of such gloss unevenness as observed on conventional moldings, so that they are useful as parts in industrial fields such as electric appliances, equipments and computers and especially as moldings such as cosmetic containers, toys, dolls, games and stationers.

In a molding obtained from the resin (B), the total area of A particles accounts for at least 10% and that of B particles falls within a range greater than 1% but smaller than 40% preferably of 1–30%, more preferably 1–25%. A resin in which the fluctuation coefficient α of the a/b ratio of B particles, said coefficient being to be described subsequently herein, is in a range of 0.05–0.5 can be used preferably. The average rubber particle size of the A particles is preferably 0.1–3 µm, more preferably 0.3–1.5 µm, most preferably 0.3–1.2 µm.

The total area of the A particles accounts for 10–60%, preferably 15–57%, more preferably 20–50%. Total areas smaller than 10% are not preferred, because they cause not only uneven falling weight impact strength but also variations in apparent color hue due to the influence of rubber particles oriented in the surface of the molding.

The present invention can provide an ABS-based resin, which can in turn provide a molding in which the total area of B particles falls within a range greater than 1% but not greater than 40% and the average rubber particle size of A particles falls within a range of 0.1–3 µm.

As the ABS-based resin (B), it is preferred to use such an ABS-based resin that the fluctuation coefficient α of the ratio of the major axis a to the minor axis, that is, the a/b ratio of each B particle is 0.05–0.5, more preferably 0.1–0.4. The term "fluctuation coefficient α" as used herein is represented by the following formula:

$$\alpha = \sigma_{n-1} \sqrt{x}$$

$$\sigma_{n-1} = \sqrt{\frac{\sum_{i=0}^{n}(X_i - X)^2}{n-1}}$$

$$X = 1/n \times \left(\sum_{i=0}^{n} X_i\right)$$

$\sigma_{n-1}$: standard deviation)

Among A particles, A particles in each of which the average of its major axis a and its minor axis b falls within a range of 1.0–1.5 µm can account for at least 1%, preferably at least 2%, more preferably 5% or more when the total area of rubber particles observed in an electron micrograph by the ultrathin sectioning technique are assumed to be 100%. If particles falling within this range are small, the resulting molding has uneven falling weight impact strength and further reduced strength. Total areas of such particular A particles outside the above range are hence not preferred.

In a molding obtained from the resin (C), the total area of A particles is preferably 10–40%, more preferably 10–35%, notably 10–30%. Percentages smaller than 10% are not preferred, because they cause not only uneven delustering but also variations in apparent color hue due to the influence of rubber particles oriented in the surface of the molding. Further, among the A particles, those having a particle size in the range of 1.0–1.5 µm preferably account for 1% or more.

In the present invention, when the total area of rubber particles observed in an electron micrograph is assumed to be 100%, it is preferred that the total area of particles A accounts for at least 10% and the total area of B particles falls in a range of 40–90%, desirably 40–80%, notably 40–60%. The average rubber particle size of the A particles can be 0.2–5.0 µm, preferably 0.2–4.0 µm, more preferably 0.3–3.0 µm. Average rubber particle sizes of A particles, which are smaller than 0.2 µm, are not preferred because they result in moldings extremely lowered in strength.

The present invention can provide an ABS-based resin, which can in turn provide a molding in which the total area of B particles is in a range of 40–90% and the average rubber particle size of A particles falls within a range of 0.2–5.0 µm.

Molding of each ABS resin according to the present invention is conducted under usual conditions, for example, at a cylinder temperature of 180°–280° C., preferably 200°–280° C. and at a mold temperature of 20°–90° C., preferably 40°–90° C. These molding conditions were commonly employed in examples of the present invention.

In a molding obtained from the resin (D), the total area of A particles accounts for at least 10% and that of B particles is in a range of 0.01–90%. The molding has a morphology to be described next.

The molding is an ABS-based resin molding, wherein when a section extending at a depth of at least 200 µm from the surface of the molding in parallel with the surface of the molding is observed in an electron micrograph taken by the ultrathin sectioning technique, the molding satisfies the following equations:

$$1 \times 10^{-4} \leq \alpha_s \leq 9$$

$$\alpha_m \leq 1 \times 10^{-2}$$

$$\alpha_m / \alpha_s \leq 5 \times 10^{-2}$$

wherein a. $\alpha_s$ is $X_1/Y_1$, $X_1$ and $Y_1$ being the percentages of the total areas of the B particles and the A particles, respectively, at the depth of 0.5–1.5 µm when the total area of all the rubber particles at the depth of 0.5–1.5 µm is assumed to be 100%, and b. $\alpha_m$ is $X_2/Y_2$, $X_2$ and $Y_2$ being the percentages of the total areas of B particles and A particles, respectively, at the depth of at least 200 µm when the total area of all the rubber particles at the depth of at least 200 µm is assumed to be 100%.

The ABS-based resin (D) can afford a molding whose surface gloss characteristic (high gloss or delustered appearance) is uniform and does not vary too much depending on the position. Moreover, the molding has high impact strength. The above-described specific morphology of rubber particles has significantly reduced uneven surface gloss.

In the molding of the ABS-based resin (D), the resin from the surface of the molding to a depth of 100 µm (a surface layer of the molding) and the resin at the depth of 200 µm from the surface of the molding and deeper (an inner layer) preferably have the same chemical composition, and the difference between the average particle size of rubber particles in the surface layer of the molding and that of rubber particles in the inner layer of the molding as measured by the solution method preferably falls within a range of 0–15%.

The molding of the ABS-based resin (D) is preferably a molding in which $\alpha_s$, $\alpha_m$ and $\alpha_m/\alpha_s$ satisfy the following equations, respectively:

$$1\times10^{-4} \leq \alpha_s \leq 5$$

$$\alpha_m 5\times10^{-3}$$

$$\alpha_m/\alpha_s \leq 1\times10^{-2}$$

To provide high gloss with small unevenness and high impact strength, the molding is preferably a molding in which $\alpha_s$, $\alpha_m$ and $\alpha_m/\alpha_s$ satisfy the following equations, respectively:

$$1\times10^{-4} \leq \alpha_s \leq 0.3$$

$$\alpha_m \leq 5\times10^{-3}$$

$$\alpha_m/\alpha_s \leq 5\times10^{-2},$$

and the average particle size of rubber particles in the inner layer as measured by a laser diffraction particle size analyzer in accordance with the solution method is 0.1–1.5 μm.

Further, to assure a good delustered appearance with small unevenness and high impact strength, the molding is preferably a molding in which $\alpha_s$, $\alpha_m$ and $\alpha_m/\alpha_s$ satisfy the following equations, respectively:

$$0.5 \leq \alpha_s \leq 9$$

$$\alpha_m \leq 1\times10^{-2}$$

$$\alpha_m/\alpha_s \leq 3\times10^{-2},$$

and the average particle size of rubber particles in the inner layer as measured by a laser diffraction particle size analyzer in accordance with the solution method are preferably both 0.7–3 μm.

$\alpha_s$ values outside the above range are not preferred, because $\alpha_s$ values smaller than $1\times10_{-4}$ develop uneven gloss while $\alpha_s$ values in excess of 9 lead to appearance of streaks on the surface of the resulting molding. The selection of the depth of 0.5–1.5 μm from the surface of the molding, that is, the surface layer and the depth of 200 μm or deeper, that is, the inner layer as regions where the morphology with which the present invention is concerned should be specified is based on our finding that the formation of the rubber particles present at such depths into shapes of specific morphologies makes it possible to control the evenness of the surface gloss of the molding and further to retain high impact strength. The selection of 0.5–1.5 μm near the surface is also based on the finding that in this depth range, the state of presence of rubber particles remain substantially constant irrespective of the depth. If the depth is shallower than 0.5 μm, the morphology of rubber particles varies substantially. If the depth exceeds 1.5 μm, on the other hand, the state of presence of rubber particles varies depending on the depth. Depths outside the above range are therefore not suited for specifying the morphology of rubber particles in an ABS-based resin molding having small unevenness in gloss. The selection of the depth of 200 μm or deeper in the direction of the thickness of the molding from the surface as the inner layer, on the other hand, is attributed to the fact that the morphology of rubber particles in this range play an important role in the molding and is directly associated with the overall impact strength of the whole molding. In particular, the morphology of the rubber particles in this range affects the impact strength of the molding.

In the present invention, the layer from the surface of the molding to the depth of 100 μm is subjected as a surface layer of the molding to chemical analyses. Using a laser diffraction particle size analyzer, the average particle size of the rubber particles in the surface layer is also measured by the solution method. Samples up to the depth of 100 μm from the surface of the molding are obtained by slicing the molding by a macrotome cutter. The depth of 100 μm may actually contain an error not greater than 10% because of the accuracy of the macrotome cutter. To determine the morphology of the rubber particles in the inner layer of the molding, on the other hand, the molding is cut off from the surface to the depth of 200 μm by the macrotome cutter in much the same way as the observation of the rubber particles in the surface layer under an electron microscope. At a depth of 200 μm or deeper, preferably at a depth of 200–300 μm, the molding is cut out as much as needed to provide sample for analyses.

According to the present invention, the difference between the average particle size of rubber particles in the surface layer of the molding and that of rubber particles in the inner layer of the molding as measured by the a laser diffraction particle size analyzer in accordance with the solution method can be controlled within a range of 0–15%, preferably 0–10%, more preferably 0–5%. Differences greater than 15% cause uneven gloss and are hence not preferred.

The expression "the resin . . . and the resin . . . have the same chemical composition" as used herein requires that the surface and inner layers of the molding have a difference of 0–2% in the composition of the styrene monomer, the acrylonitrile monomer, the rubbery polymer and if any, other monomer or monomers, as well as a difference of 0–2%, preferably 0–1% in the reduced viscosity of the copolymer excluding rubber particles.

3. Control Method of this Invention for the Morphology and Quality of ABS-based Resin No particular limitation is imposed on the production process of the molding of this invention insofar as it has the morphology described above under 2. A description will however be made of one example of preferred production processes for ABS-based resins. Incidentally, the following description of this production process is equivalent to a description of the control method of the present invention for the morphology and quality.

Where a production process of an ABS-based resin by solution or bulk polymerization includes such a recovery step that after completion of polymerization including formation of rubber particles, for example, a polymerization mixture obtained after the completion of the polymerization and containing the resultant polymer, the unreacted monomers and a solvent is heated and at the same time as the heating or subsequent to the heating, the polymerization mixture is introduced into a vacuum chamber to separate the monomers and the solvent from the resin component, the proportion of rubber particles which can become B particles increases when the resin is recovered by setting the outlet temperature of the recovery step at a level in a range of 130°–300° C. and causing the outlet temperature to fluctuate instead of maintaining it at the level.

The quality of an ABS-based resin according to the present invention can be controlled by controlling rubber particles located at a depth of 0.5–1.5 μm from a surface of a molding of the ABS-based resin to morphologically comprise at least the following two types of particles:

(1) A particles having an a/b ratio not greater than 1.5, wherein a and b represent a major axis and a minor axis, respectively, and (2) B particles having an a/b ratio not smaller than 5, wherein a and b have the same meanings as defined above when a section extending at the depth in parallel with the surface of the molding is observed in an electron micrograph taken by the ultrathin sectioning technique; and assuming that the total area of the rubber particles as observed in the electron micrograph is 100%, also controlling the total area of A particles to account for at least 10% and that of B particles to be in a range of 0.01–90%.

More specifically, the quality of an ABS-based resin can be controlled in a manner to be described next. Upon production of the ABS-based resin by a solution or bulk polymerization process comprising (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component, the method comprises setting an outlet temperature of the recovery step in a range of 180°–300° C., (1) the outlet temperature of the recovery step is caused to fluctuate so that the product (F) of a deviation (%) of the outlet temperature and the number of fluctuations of the outlet temperature per hour falls within a range of 0.5–150 or (2) at least two kinds of ABS-based resins, which have been obtained by causing the outlet temperature to fluctuate, are blended so that the sum of the products of Fs and blend percentages×1/100 of the individual ABS-based resins falls within the range of 0.5–150.

This method will be exemplified further. This method can be achieved by maintaining the average value ($T_{av}$) of the outlet temperature of the recovery step constant at a level in a range of 180°–300° C., preferably 220°–270° C. and causing the temperature to fluctuate 0.5–33 times per hour in a range of 1–15% of the average value ($T_{av}$).

In the present invention, a deviation (%) of temperature relative to an outlet temperature of the recovery step and the number of fluctuations of the temperature can be determined by methods to be described below.

The width of fluctuations relative to an average value ($T_{av}$) is called a "temperature deviation ($T_{de}$)". A greater temperature deviation ($T_{de}$) can result in more rubber particles which will eventually become B particles in a molding.

The average value ($T_{av}$) of the outlet temperature of the recovery step, as referred to in the present invention, can be calculated in accordance with the following formula:

Average value ($T_{av}$) of recovery temperature $$= \sum_{i=1}^{60} T_i/60$$

($T_i$: value of temperature in every minute)

The deviation ($T_{de}$: temperature deviation in every hour) of the outlet temperature of the recovery step, as referred to in the present invention, can be calculated in accordance with the following formula:

Deviation of the outlet temperature of the recovery step ($T_{de}$)= $[(T_{max}-T_{min})/T_{av}] \times 100$ where $T_{max}$ is the greatest value of the outlet temperature of the recovery step in an hour and $T_{min}$ is the smallest value of the outlet temperature of the recovery step in an hour. The number of fluctuations of the temperature in an hour is called "the fluctuation number" (note: fluctuations of a temperature deviation smaller than 1% are ignored), and indicates how often the derivative of temperature with respect to time changes to a positive or negative side. A greater number of hourly fluctuations of the temperature results in more rubber particles which will eventually become B particles in a molding. A molding according to the present invention can be obtained by conducting a molding operation while using such an ABS-based resin as the entire part or a partial part of a molding resin so that the objects of the present invention are met.

Upon using the above resin, it is necessary to collect the resin, which has been produced in at least one hour, preferably 3 hours or longer, as a single lot so that effects of fluctuations of the outlet temperature of the recovery step can be reflected.

The present invention also provides a method for controlling the quality of an ABS-based resin, wherein upon production of the ABS-based resin by a solution or bulk polymerization process comprising (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component, the method comprises setting an outlet temperature of the recovery step in a range of 180°–300° C. and blending at least two kinds of ABS-based resins, which have been obtained by causing the outlet temperature to fluctuate, so that the sum of the products of Fs and blend percentages× 1/100 of the individual ABS-based resins falls within the range of 0.5–150.

Particularly preferred is a method for obtaining an ABS-based resin by blending at least two ABS-based resins, in which the ratio in product of one of said at least two ABS-based resins, said at least one ABS-based resin having a greatest product of a deviation (%) of its outlet temperature of the recovery step and the number of fluctuations of its outlet temperature per hour, to another ABS-based resin having a smallest product is 1–20, preferably 1–15, more preferably 1–10.

According to a further embodiment of the method of the present invention, there is also provided a method for producing an ABS-based resin by blending at least two ABS-based resins obtained under different recovery conditions. To obtain these at least two ABS-based resins, a solution or bulk polymerization process is employed, which comprises (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component. Namely, the at least two ABS-base resins are obtained by conducting the recovery step in a recovery unit equipped with at least two vacuum chambers arranged in parallel with each other, controlling the outlet temperatures of the respective vacuum chambers in a range of 180°–300° C. and causing the outlet temperatures of the respective vacuum chambers to fluctuate. These at least two ABS-based resins are blended so that the sum of the products of Fs and blend percentages×$\frac{1}{100}$ of the individual ABS-based resins falls within the range of 0.5–150, in which each F represents the product of a deviation (%) of the outlet temperature and the number of fluctuations of the outlet temperature per hour when the corresponding one of said at least two ABS-based resins was obtained.

The present invention therefore provides a method for controlling an ABS-based resin by adjusting the deviation (%) of the outlet temperature of the recovery step and the number of fluctuations of the temperature per hour as described above so that moldings of the following different properties can be obtained:

(A) Moldings having high gloss with small unevenness, (B) Moldings having small unevenness in falling weight impact strength, (C) Moldings having good delustered appearance with small unevenness, and (D) Moldings uniform gloss characteristics (high gloss or delustered appearance) with small position-dependent variations on their surfaces and high impact strength.

5. Process for the Production of ABS-based Resin Having the Morphology Specified in the Present Invention A description will now be made of one example of preferred processes for the production of an ABS-based resin useful for the production of the moldings (A). It is however to be noted that the production process is not limited particularly to the following production process of an ABS-based resin insofar as the resulting ABS-based resin can provide a molding containing rubber particles specified by the present invention.

As a production process of an ABS-based resin which can afford such a molding, there is a method for controlling the product (F) of a deviation (%) of the outlet temperature of the recovery step and the number of fluctuations of the outlet temperature per hour (hereinafter abbreviated as "the product of the deviation and the number of fluctuations") or the sum of the products of Fs and blend percentages×$\frac{1}{100}$ of at least two ABS-based resins at 0.5–15. In this production process, the deviation of the outlet temperature of the recovery step is preferably 1–5% and the number of fluctuations of the outlet temperature per hour desirably falls within a range of 0.5–15. The present invention also relates to a molding which is obtained by forming the ABS-based resin so produced.

Where at least two ABS-based resin are used, the ratio in product of one of said at least two ABS-based resins, said at least one ABS-based resin having a greatest "product of a deviation and the number of fluctuations", to another ABS-based resin having a smallest product is preferably 1–20, more preferably 1–10, and most preferably 1–5. The present invention also relates to a molding which is obtained by forming the ABS-based resin so produced.

The moldings (A) of the ABS-based resin obtained as described above are by themselves usable as final products, for example, as machine parts or components, stationeries, toys, dolls, games and/or the like owing to the mechanical and chemical characteristics of the ABS-based resin. The forming can be conducted using a usual resin forming method known to date, for example, injection molding or extrusion. As mentioned above, uneven surface gloss is directly associated with molding conditions. The present invention features the control of the morphology of rubber particles located adjacent the surface of each molding. Use of at least two ABS-based resins obtained under different production conditions makes it possible to obtain a molding good especially in the evenness of gloss.

The moldings (A) of the ABS-based resin obtained by the above production process of the present invention have high gloss and are free of such gloss unevenness as observed on conventional moldings, so that they are useful as parts or components in industrial fields such as electric appliances and equipments and computers and especially as moldings such as cosmetic containers, toys, dolls, games and stationers.

A description will next be made of one example of preferred processes for the production of an ABS-based resin useful for the production of the moldings (B). It is however to be noted that the production process is not limited particularly to the following production process of an ABS-based resin insofar as the resulting ABS-based resin can provide a molding containing rubber particles specified by the present invention.

As a process for the production of an ABS-based resin useful in obtaining the molding (B), there is a method in which the above-described "the product of the deviation and the number of fluctuations" or "the sum of the products of Fs and blend percentages×$\frac{1}{100}$" is controlled to fall within the range greater than 15 but not greater than 35. In this production process, the deviation of the outlet temperature of the recovery step is preferably 3–10% and the number of fluctuations of the outlet temperature per hour desirably falls within a range of 5–15. The present invention also relates to a molding which is obtained by forming the ABS-based resin so produced. The ratio in product of one of said at least two ABS-based resins, said at least one ABS-based resin having a greatest "product of a deviation and the number of fluctuations", to another ABS-based resin having a smallest product is preferably 1–20, more preferably 1–10, and most preferably 1–5. The present invention also relates to a molding which is obtained by forming the ABS-based resin so produced.

The moldings (B) of the ABS-based resin obtained as described above are by themselves usable as final products, for example, as machine parts or components, stationeries, toys, dolls, games and/or the like owing to the mechanical and chemical characteristics of the ABS-based resin. The forming can be conducted using a usual resin forming method known to date, for example, injection molding or extrusion. As mentioned above, uneven falling weight impact strength is directly associated with molding conditions. The present invention has made it possible to reduce unevenness in falling weight impact strength by controlling the morphology of rubber particles located adjacent the surface of each molding.

The moldings (B) of the ABS-based resin obtained by the above production process of the present invention have small unevenness in falling weight impact strength unlike conventional moldings, so that they are useful as parts or components in industrial fields such as electric appliances and equipments and computers and especially as industrial parts or components such as automotive parts or components.

A description will next be made of one example of preferred processes for the production of an ABS-based resin useful for the production of the moldings (C). It is however to be noted that the production process is not limited particularly to the following production process of an ABS-based resin insofar as the resulting ABS-based resin can provide a molding containing rubber particles specified by the present invention.

As a process for the production of an ABS-based resin useful in obtaining the molding (C), there is a method in which the above-described "the product of the deviation and the number of fluctuations" or "the sum of the products of Fs and blend percentages×1/100" is controlled to fall within the range greater than 35 but not greater than 150. In this production process, the deviation of the outlet temperature of the recovery step is preferably 3–15% and the number of fluctuations of the outlet temperature per hour desirably falls within a range of 11–33. The present invention also relates to a molding which is obtained by forming the ABS-based resin so produced. The ratio in product of one of said at least two ABS-based resins, said at least one ABS-based resin having a greatest "product of a deviation and the number of fluctuations", to another ABS-based resin having a smallest product is preferably 1–10, more preferably 1–5. The present invention also relates to a molding which is obtained by forming the ABS-based resin so produced.

The moldings (C) of the ABS-based resin obtained by the above production process of the present invention have a good delustered appearance and moreover are free of such unevenness in delustered appearance as observed on conventional moldings, so that they are useful as parts or components in industrial fields such as electric appliances and equipments and computers and especially as moldings such as cosmetic containers, toys, dolls, games and stationers.

Usable is a method for producing an ABS-based resin by solution or bulk polymerization. This method comprises (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component. In the recovery step (ii), the outlet temperature is set at a level in a range of 180°–300° C. The outlet temperature of the recovery step (ii) is caused to fluctuate under control so that "the product of the deviation and the number of fluctuations" or "the sum of the products of Fs and blend percentages×1/100" falls within a range of 0.5–150. In the above recovery step (ii), an ABS-based resin is recovered by varying the feed rate of the polymerization mixture to the recovery step instead of maintaining it constant and controlling within a particular range the average value of the temperature of the resin at the outlet of the recovery step. The ABS-base resin so recovered can afford the moldings (D). After the recovery, the ABS-based resin is processed through a granulation step and is then obtained in a granular form. No particular limitation is imposed on conditions for the granulation step, so that the granulation step can be conducted under conventional conditions.

A description will now be made of a preferred embodiment of the above method in which the recovery is conducted while varying the feed rate of the polymerization mixture to the recovery step instead of maintaining it constant.

Assuming that the polymerization mixture is fed at a flow rate FW to the recovery step, the quality of an ABS-based resin to be recovered is controlled by determining the product of a deviation ($FW_{de}$) of FW and the number ($NFW_{ch}$) of fluctuations of the flow rate. $FW_{de}$ is define relative to an average flow rate $FW_{av}$ in accordance with the following formula:

$$FW_{av} = \sum_{i=1}^{180} FW_i / 180$$

($FW_i$: flow rate per minute, l/min)

On the other hand, the deviation ($FW_{de}$) of the flow rate can be calculated in accordance with the following formulas:

$$DFW_i = |FW_{ch} - FW_{av}|$$

($FW_{ch}$: value of FW when the derivative of FW with respect to time changes from positive to negative and vice versa.)

$$FW_{de} = \left\{ \sum_{i=1}^{NFW_{ch}} (DFW_i / FW_{av}) \right\} / NEW_{ch} \times 100$$

($NFW_{ch}$: the number of changes of the above derivative from positive to negative and vice versa per hour.)

To control within a particular range the average ($T_{av}$ °C.) of the temperature of the resin at the outlet of the recovery step, TF calculated in accordance with the following formula is used:

$$TF = 300 - T_{av}$$

These values are calculated by conducting the production of the ABS-based resin for 3 hours or longer. Fluctuations smaller than 0.5% relative to the value of $FW_{av}$ are deemed to be free of fluctuations and are hence ignored.

To obtain a molding having the $\alpha_s$ specified in the present invention, TF is generally 0–100, preferably 20–80, more preferably 30–75 and the product of TF and $FW_{de}$ is generally 0–3,000, preferably 100–2,000, more preferably 300–2,000. When the product of TF and $FW_{de}$ exceeds 3,000, $\alpha_s$ becomes greater than 9.

To achieve the $\alpha_m$ as specified in the present invention, the product (fFW) of $FW_{de}$ and $NFW_{ch}$ is preferably 1.5–500, more preferably 2–200, most preferably 5–50. An fFWs greater than 500 leads to an $\alpha_m$ greater than $1 \times 10^{-2}$.

No detailed mechanism of such phenomena has been clearly elucidated yet. They however appear to be attributable to certain interaction among rubber particles, which have been formed by the polymerization, under the influence of FW and TF. It is gathered that this interaction is not clear at the stage of the completion of the polymerization but shows its characteristics when the resin so obtained is molded or otherwise formed.

The present invention will next be described in further detail by the following examples. It should however be borne in mind that the present invention is not limited by them.

Various properties of the molding obtained in each example were evaluated by the following testing methods.

In each example, injection molding was conducted using pellets obtained therein. Employed as a mold was one suited for the production of the molding shown in FIGS. 1A and 1B. The mold temperature was controlled at 50° C.

(1) Measurements of gloss and delustering

Figure 1B:
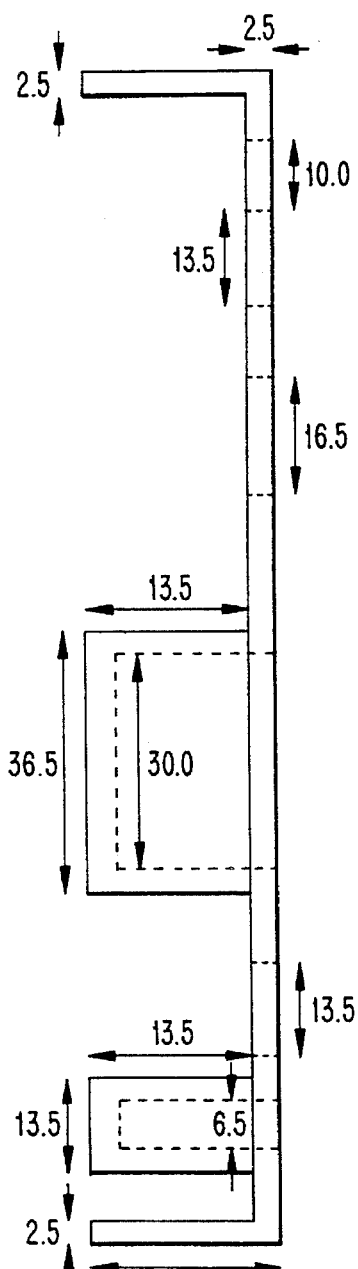

Using a molding of the shape and dimensions shown in FIGS. 1A and 1B, its gloss was measured by the gloss measuring method (60° specular gloss) of JIS K7105 at ten (10) points indicated by mark (X). The average and standard deviation of the ten (10) gloss values so measured were determined. A greater standard deviation indicates greater gloss or delustering unevenness.

(2) Observation of streaks

The external appearance of each test piece subjected to the gloss measurement was observed with the naked eye to determine the existence or non-existence of streaks.

(3) Measurement of impact strength

A test piece was cut out from each molding, and its impact strength was then measured in accordance with the Izod impact strength testing method (JIS-K 7110).

(4) Measurement of falling weight impact strength

Using a molding of the shape and dimensions shown in FIGS. 1A and 1B, its falling weight impact strength was measured by the method of JIS K7211 at the ten (10) points shown in FIGS. 1A and 1B. The standard deviations of the falling weight impact strength values so obtained was determined. A greater standard deviation of the falling weight impact strength indicates greater unevenness in falling weight impact strength.

(5) Measurement of heat resistance

The Vicat softening point of each molding was evaluated in accordance with the method of ASTM D 1525 by using a test piece cut out as a sample from the molding.

(6) Measurement of rubber particles

Using a TEM (transmission electron microscope), the shapes of rubber particles were measured by the ultrathin sectioning technique.

(7) Measurements of the average particle sizes of rubber particles in a surface and inner layers of each molding A surface and inner layers of each molding were each cut out by a macrotome cutter in a thickness needed for the measurement of its particle size. Each sample was titrated with iodine to determine the amount of butadiene. Further, 10 parts by weight of each sample so cut out were maintained for 10 hours in contact with 100 parts of methyl ethyl ketone as a solvent. The liquid mixture so obtained was centrifuged to eliminate a gel portion and the styrene-acrylonitrile component (AS component) was separated from the solution. The AS component was subjected to an elemental analysis and based on the C/H/N ratio so determined, the amount of acrylonitrile was determined. Further, the reduced viscosity ($\eta_{sp/c}$) of the AS component was determined by the solution viscosity method while using dimethylformamide as a solvent.

(9) Fluctuation coefficient of B particles: α

The fluctuation coefficient α of B particles in each sample was determined in accordance with the following formula:

$$\alpha = \sigma_{n-1} \sqrt{x}$$

$$\sigma_{n-1} = \sqrt{\frac{\sum_{i=0}^{n}(X_i - X)^2}{n-1}}$$

$$X = 1/n \times \left( \sum_{i=0}^{n} X_i \right)$$

EXAMPLE O-1

Example O describes a method for controlling the quality of an ABS-based resin.

a. Production Process of ABS-based Resin

Prepared hourly was a batch solution consisting of 75.5 parts by weight of styrene, 24.5 parts by weight of acrylonitrile, 5 parts by weight of ethylbenzene, 7 parts by weight of a rubbery polymer (a styrene-butadiene block copolymer having a solution viscosity of 10 cst when measured at 25° C. in the form of a 5 wt. % solution in styrene), 0.05 part by weight of 1,1-bis(t-butylperoxy)-3,3,5-trimethylcyclohexane as an organic peroxide and 0.2 part by weight of mercaptane. The solution so obtained was polymerized in a three-stage reactor constructed of three agitated polymerization tanks arranged in a row.

The batch solution so obtained was continuously supplied to the first tank. In the first tank, the degree of agitation and the reaction temperature were set at 350 rpm and 110° C., respectively. In each of the second and third tanks, the reaction temperature was set 20° C. higher than that in the preceding tank. From the third tank, the polymerization mixture was fed to a recovery unit. Described specifically, the polymerization mixture was introduced in equal portions into two recovery units arranged in parallel with each other and constructed individually of a preheater and a vacuum chamber. Resin portions so recovered were combined together. The hourly amount of the monomers at an inlet of the recovery unit was 35 parts by weight, so that the total hourly amount of the monomers converted into the polymer was 65 parts by weight. The reactor was continuously operated for 30 hours while changing every 10 hours the temperature [recovery temperature ($T_{av}$)], the temperature deviation ($T_{de}$) and the number of hourly temperature fluctuations ($N_{ct}$) at an outlet of the recovery unit under the conditions shown in Table 1. Physical properties of polymer samples so obtained during the 7th–10th hours (O-1), the 17th–20th hours (O-2) and the 27th–30th hours (O-3) and the morphologies of their moldings were evaluated.

The polymerization conditions in this example are shown in Table 1 and the evaluation results of the morphologies of the moldings are shown in Table 2.

TABLE 1

| | | Polymer sample | | |
|---|---|---|---|---|
| Item | Unit | O-1 | O-2 | O-3 |
| Degree of agitation in the first reaction tank | rpm | | 350 | |
| First recovery unit | | | | |
| Recovery temperature ($T_{av}$) | °C. | 250 | 220 | 200 |
| Temperature deviation ($T_{de}$) | % | 1.0 | 2.0 | 5.0 |
| Number of hourly temperature fluctuations ($N_{ct}$) | Times | 2 | 7 | 16 |
| Second recovery unit | | | | |
| Recovery temperature ($T_{av}$) | °C. | 230 | 200 | 180 |
| Temperature deviation ($T_{de}$) | % | 2.0 | 3.0 | 7.0 |
| Number of hourly temperature fluctuations ($N_{ct}$) | Times | 3 | 10 | 11 |
| $T_{de} \times N_{ct}$ | — | 4 | 22 | 76 |

TABLE 2

| | | Example | | |
|---|---|---|---|---|
| Item | Unit | O-1 | O-2 | O-3 |
| Injection molding temperature | °C. | 220 | 220 | 200 |
| Average gloss | % | 95 | 83 | 32 |
| Standard deviation of gloss (unevenness of gloss/delustering) | % | 3.1 | 8.1 | 4.2 |
| Average falling weight impact strength | cm | 71 | 85 | 80 |
| Standard deviation of falling weight impact strength | cm | 34 | 15.2 | 41.3 |

TABLE 2-continued

| Item | | Unit | Example | | |
|---|---|---|---|---|---|
| | | | O-1 | O-2 | O-3 |
| Izod impact strength | | kg.cm/cm | 17 | 18 | 18 |
| Vicat softening temperature | | °C. | 106 | 106 | 105 |
| Measurement of rubber particles (Areas of A and B particles) | A particles | % | 72 | 52 | 31.4 |
| | B particles | % | 0.2 | 12 | 52.1 |
| Average particle size of A particles | | μm | 0.5 | 0.55 | 0.6 |
| Percentage of 1–1.5 μm particles in A particles | | % | 2.3 | 5.4 | 7.8 |

EXAMPLE A

Example A describes illustrative production of an ABS-based resin (A) capable of providing a molding having a high gloss with small unevenness.

a. Production Process of an ABS-based Resin

Prepared was a batch solution consisting of 75.5 parts by weight of styrene, 24.5 parts by weight of acrylonitrile, 5 parts by weight of ethylbenzene, 7 parts by weight of a rubbery polymer (a styrene-butadiene block copolymer having a solution viscosity of 10 cst when measured at 25° C. in the form of a 5 wt. % solution in styrene), 0.05 part by weight of 1,1-bis(t-butylperoxy)- 3,3,5-trimethylcyclohexane as an organic peroxide and 0.2 part by weight of mercaptane. The solution so obtained was polymerized in the same three-stage, agitated, in-series reactor as that employed in Example O-1.

The batch solution so obtained was continuously supplied to the first polymerization tank. In the first tank, the degree of agitation and the reaction temperature were set at 70–400 rpm and 110° C., respectively. In each of the second and third tanks, the reaction temperature was set 20° C. higher than that in the preceding tank. From the third tank, the polymerization mixture was fed to a recovery unit constructed of a preheater and a vacuum chamber. The hourly amount of the monomers at the inlet of the recovery unit was 35 parts by weight so that the total hourly amount of the monomers converted into a polymer was 65 parts by weight. Incidentally, each sample polymer employed in tests was obtained by mixing as a single lot the polymer recovered over a period of three hours.

Polymerization was conducted under the conditions varied in the degree of agitation in the first reactor, the temperature of the resin [recovery temperature ($T_{av}$)], the temperature deviation ($T_{de}$) and the number of hourly temperature fluctuations ($N_{ct}$) at the outlet of the recovery unit, whereby polymer samples a1–a4 were obtained as shown in Table 3. Incidentally, the temperature deviation ($T_{de}$) and the number of hourly temperature fluctuations ($N_{ct}$) were varied by changing the average temperature and the flow rate of a heat transfer medium in a jacket of the preheater.

TABLE 3

| Item | Unit | Polymer sample | | | |
|---|---|---|---|---|---|
| | | a1 | a2 | a3 | a4 |
| Degree of agitation | rpm | 400 | 250 | 70 | 400 |
| Recovery temperature ($T_{av}$) | °C. | 200 | 220 | 250 | 210 |
| Temperature deviation ($T_{de}$) | % | 1.0 | 3.0 | 1.0 | 5.0 |
| Number of hourly temperature fluctuations ($N_{ct}$) | Times/h | 2 | 1 | 3 | 10 |
| $T_{de} \times N_{ct}$ | | 2 | 3 | 3 | 50 |

EXAMPLE A-1

By an extruder, 50 parts by weight of the polymer sample a1 and 50 parts by weight of the polymer sample a2 were molten and kneaded. The mass so obtained was injection molded at a cylinder temperature of 230° C. and a mold temperature of 50° C. The molding so obtained was found to contain 0.8% of B particles and to have a standard deviation of gloss values as small as 3.0%, thereby indicating small unevenness in gloss. The results are shown in Table 4.

COMPARATIVE EXAMPLE A-1

In the presence of 16 parts by weight of a polybutadiene latex (rubber particle size: 0.5 μm), 84 parts by weight of a monomer mixture consisting of 70% of styrene and 30% of acrylonitrile were subjected to emulsion polymerization. The graft copolymer so obtained was solidified with sulfuric acid, neutralized with caustic soda, washed, filtered and dried, whereby an ABS-based resin was obtained. The resin sample so obtained was molded at an injection molding temperature of 220° C. As a result of observation of the molding, B particles were found to amount to 0%. The molding had a standard deviation of gloss values as large as 8.2%, thereby indicating substantial unevenness in gloss. The results are shown in Table 4.

EXAMPLE A-2

By an extruder, 90 parts by weight of the polymer sample a3 and 10 parts by weight of the polymer sample a4 were molten and kneaded. The sample so obtained was molded at an injection molding temperature of 220° C. As a result of observation of rubber particles in the molding so obtained, B particles were found to amount to 0.18%. The molding had a standard deviation of gloss values as small as 2.1%, thereby indicating small unevenness in gloss. The results are shown in Table 4.

EXAMPLE A-3

By the extruder, 70 parts by weight of the polymer sample a2 and 30 parts by weight of the polymer sample a3 were molten and kneaded. The sample so obtained was molded at an injection molding temperature of 200° C. As a result of observation of rubber particles in the molding so obtained, B particles were found to amount to 0.5%. The molding had a standard deviation of gloss values as small as 2.0%, thereby indicating small unevenness in gloss. The results are shown in Table 4.

TABLE 4

| Item | Unit | Example A-1 | Example A-2 | Example A-3 | Comp. Ex. A-1 |
|---|---|---|---|---|---|
| Polymer sample No. | | 1/2 | 3/4 | 2/3 | Emulsion polymerization |
| Blending ratio | parts by weight | 50/50 | 90/10 | 70/30 | |
| Injection molding temperature | °C. | 230 | 220 | 200 | 220 |
| Product after blending | | 2.5 | 7.7 | 3.0 | |
| Ratio in product of polymer having greater product to polymer having smaller product | | 1.5 | 16.7 | 1 | |
| Average gloss | % | 99 | 97 | 98 | 98 |
| Standard deviation of gloss (Unevenness of gloss) | % | 3.0 | 2.1 | 2.0 | 5.2 |
| Izod impact strength | kg.cm/cm | 19 | 19 | 18 | 16 |
| Vicat softening temperature | °C. | 106 | 106 | 105 | 101 |
| Measurement of rubber particles (Areas of A and B particles) | A particles | 88.0 | 71.0 | 74.0 | 73.0 |
| | B particles | 0.80 | 0.18 | 0.30 | — |
| Percentage of 1.0–1.5 μm particles in A particles | % | 0.3 | 2.0 | 1.4 | 0.5 |
| Average particle size of A particles | μm | 0.6 | 0.5 | 0.4 | 0.5 |

EXAMPLE B

Example B describes illustrative production of an ABS resin (B) capable of providing a molding having small unevenness in falling weight impact strength.

a. Production Process of ABS-based Resin

Prepared was a batch solution consisting of 75.5 parts by weight of styrene, 24.5 parts by weight of acrylonitrile, 10 parts by weight of ethylbenzene, 9 parts by weight of a rubbery polymer (a styrene-butadiene block copolymer having a solution viscosity of 10 cst when measured at 25° C. in the form of a 5 wt. % solution in styrene), 0.03 part by weight of 1,1-bis(t-butylperoxy)- 3,3,5-trimethylcyclohexane as an organic peroxide and 0.1 part by weight of mercaptane. The solution so obtained was polymerized in the same three-stage, agitated, in-series polymerization tank reactor as that employed in Example O-1.

The batch solution so obtained was continuously supplied to the first tank. In the first tank, the degree of agitation and the reaction temperature were set at 200 rpm and 100° C., respectively. In each of the second and third tanks, the reaction temperature was set 20° C. higher than that in the preceding tank. From the third tank, the polymerization mixture was fed to the same recovery unit as that employed in Example A. The hourly amount of the monomers at the inlet of the recovery unit was 35 parts by weight, so that the total hourly amount of the monomers converted into the polymer was 65 parts by weight.

Polymerization was conducted while changing the resin temperature [recovery temperature ($T_{av}$)], the temperature deviation ($T_{de}$) and the number of hourly temperature fluctuations ($N_{ct}$) at the outlet of the recovery unit, whereby polymer samples b1–b5 were obtained as shown in Table 5. Incidentally, the temperature deviation and the number of hourly temperature fluctuations were varied by changing the average temperature and the flow rate of the heat transfer medium in the jacket of the preheater.

TABLE 5

| Item | Unit | b1 | b2 | b3 | b4 | b5 |
|---|---|---|---|---|---|---|
| Recovery temperature ($T_{av}$) | °C. | 180 | 200 | 230 | 180 | 170 |
| Temperature deviation ($T_{de}$) | % | 2.0 | 2.0 | 3.0 | 5.0 | 3.0 |
| Number of hourly temperature fluctuations ($N_{ct}$) | Times/h | 7 | 9 | 7 | 15 | 20 |
| $T_{de} \times N_{ct}$ | | 14 | 18 | 21 | 75 | 60 |

EXAMPLE B-1

By an extruder, 80 parts by weight of the polymer sample b2 and 20 parts by weight of the polymer sample b3 were molten and kneaded. The mass so obtained was injection molded at a cylinder temperature of 200° C. and a mold temperature of 50° C. The molding so obtained was found to contain 1.4% of B particles. The fluctuation coefficient α of the B particles was 0.13. It had a standard deviation of falling weight impact strength of 19.6 cm, thereby indicating small unevenness in falling weight impact strength.

COMPARATIVE EXAMPLE B-1

In the presence of 20 parts by weight of a polybutadiene latex (rubber particle size: 0.8 μm), 80 parts by weight of a monomer mixture consisting of 70% of styrene and 30% of acrylonitrile were subjected to emulsion polymerization. The graft copolymer so obtained was solidified with sulfuric acid, neutralized with caustic soda, washed, filtered and dried, whereby an ABS-based resin was obtained. The resin sample so obtained was molded at an injection molding temperature of 220° C. In the resultant molding, no B particles were observed. The molding had a standard deviation of falling weight impact strength of 40.5 cm, thereby indicating substantial unevenness in falling weight impact strength.

EXAMPLE B-2

By an extruder 50 parts by weight of the polymer sample b1 and 50 parts by weight of the polymer sample b2 were molten and kneaded. The sample so obtained was molded at an injection molding temperature of 230° C. Measurement results of the molding so obtained are shown in Table 6. In the resultant molding, B particles were found to amount to 15.7%. The fluctuation coefficient α of the B particles was 0.30 and the standard deviation of its falling weight impact strength was 17.4 cm, thereby indicating small unevenness in falling weight impact strength.

EXAMPLE B-3

By an extruder, 90 parts by weight of the polymer sample b3 and 10 parts by weight of the polymer sample b4 were molten and kneaded. The sample so obtained was molded at an injection molding temperature of 210° C. Measurement results of the molding so obtained are shown in Table 6. In the resultant molding, the B particles were found to amount to 7.2%. The fluctuation coefficient α of the B particles was 0.29. The standard deviation of its falling weight impact strength was 15.2 cm, thereby indicating small unevenness in falling weight impact strength.

EXAMPLE B-4

By an extruder, 80 parts of the polymer sample b2 and 20 parts by weight of the polymer sample b5 were molten and kneaded. The sample so obtained was molded at an injection molding temperature of 200° C. Measurement results of the molding so obtained are shown in Table 6. In the resultant molding, the B particles were found to amount to 22.0%.

The fluctuation coefficient α of the B particles was 0.4. The standard deviation of its falling weight impact strength was 14.3 cm, thereby indicating small unevenness in falling weight impact strength.

TABLE 6

| Item | Unit | Example B-1 | Example B-2 | Example B-3 | Example B-4 | Comp. Ex. B-1 |
|---|---|---|---|---|---|---|
| Polymer sample No. | | 2/3 | 1/2 | 3/4 | 2/5 | Emulsion polymerization |
| Blending ratio | parts by weight | 80/20 | 50/50 | 90/10 | 80/20 | |
| Injection molding temperature | °C. | 200 | 230 | 210 | 200 | 220 |
| Product after blending | | 18.6 | 16.0 | 26.4 | 26.4 | |
| Ratio in product of polymer having greater product to polymer having smaller product | | 1.2 | 1.3 | 3.6 | 3.3 | |
| Average falling weight impact strength | cm | 83 | 93 | 98 | 90 | 50 |
| Standard deviation of falling weight impact strength | cm | 19.6 | 17.4 | 15.2 | 14.3 | 40.5 |
| Izod impact strength | kg.cm/cm | 19 | 18 | 19 | 18 | 16 |
| Vicat softening temperature | °C. | 106 | 103 | 104 | 105 | 102 |
| Measurement of rubber particles (Areas of A and B particles) A particles | % | 45.0 | 30.3 | 57.0 | 43.2 | 72.0 |
| Measurement of rubber particles (Areas of A and B particles) B particles | % | 1.4 | 15.7 | 7.2 | 22.0 | 0.0 |
| Fluctuation coefficient α of B particles | % | 0.13 | 0.30 | 0.29 | 0.4 | — |
| Average particle size of A particles | μm | 0.9 | 1.2 | 1.5 | 1.2 | 0.5 |

EXAMPLE C

Example C describes illustrative production example of an ABS-based resin (C) capable of providing a molding with good delustered property with small unevenness.

a. Production Process of ABS-based Resin

Prepared was a batch solution consisting of 75.5 parts by weight of styrene, 24.5 parts by weight of acrylonitrile, 8 parts by weight of ethylbenzene, 7 parts by weight of a rubbery polymer (a butadiene polymer having a solution viscosity of 35 cst when measured at 25° C. in the form of a 5 wt. % solution in styrene), 0.04 part by weight of 1,1-bis(t-butylperoxy)-3,3,5-trimethylcyclohexane as an organic peroxide and 0.15 part by weight of mercaptane.

The solution so obtained was polymerized in the same three-stage, agitated, in-series polymerization tank reactor as that employed in Example O-1. The batch solution so obtained was continuously supplied to the first tank. In the first tank, the degree of agitation and the reaction temperature were set at 200 rpm and 110° C., respectively. In each of the second and third tanks, the reaction temperature was set 20° C. higher than that in the preceding tank. From the third tank, the polymerization mixture was fed to the same recovery unit as that employed in Example A. The hourly amount of the monomers at the inlet of the recovery unit was 35 parts by weight, so that the total hourly amount of the monomers converted into the polymer was 65 parts by weight.

Polymerization was conducted while changing the degree of agitation in the first tank and the resin temperature [recovery temperature ($T_{av}$)], the temperature deviation ($T_{de}$) and the number of hourly temperature fluctuations ($N_{ct}$) at the outlet of the recovery unit, whereby polymer samples c1–c5 were obtained as shown in Table 7. Incidentally, the temperature deviation ($T_{de}$) and the number of hourly temperature fluctuations ($N_{ct}$) were varied by changing the average temperature and the flow rate of a heat transfer medium in the jacket of the preheater. Incidentally, each sample polymer employed in tests was obtained by mixing as a single lot the polymer recovered over a period of three hours.

TABLE 7

| Item | Unit | Polymer sample | | | | |
|---|---|---|---|---|---|---|
| | | c1 | c2 | c3 | c4 | c5 |
| Recovery temperature ($T_{av}$) | °C. | 170 | 190 | 200 | 170 | 180 |
| Temperature deviation ($T_{de}$) | % | 3.0 | 7.0 | 5.0 | 12.0 | 15.0 |
| Number of hourly temperature fluctuations ($N_{ct}$) | Times/h | 24 | 13 | 16 | 25 | 2 |
| $T_{de} \times N_{ct}$ | | 72 | 91 | 80 | 300 | 30 |

EXAMPLE C-1

By an extruder, 60 parts by weight of the polymer sample c1 and 40 parts by weight of the polymer sample c5 were molten and kneaded. The sample so obtained was molded at a cylinder temperature of 210° C. and a mold temperature of 50° C. In the molding so obtained, B particles were found to amount to 62.2%. The molding had a standard deviation of gloss values as low as 4.2%, had small unevenness in delustering and had an average gloss of 20%. The molding therefore had an excellent delustered property. The measurement results are shown in Table 8.

COMPARATIVE EXAMPLE C-1

In the presence of 16 parts by weight of a polybutadiene latex (rubber particle size: 1.5 μm), 84 parts by weight of a monomer mixture consisting of 70% of styrene and 30% of acrylonitrile were subjected to emulsion polymerization. The graft copolymer so obtained was solidified with sulfuric acid, neutralized with caustic soda, washed, filtered and dried, whereby an ABS-based resin was obtained. The sample resin so obtained was molded at an injection molding temperature of 200° C. Evaluation results of the molding are shown in Table 8. As a result of observation of rubber particles in the molding, B particles were found to amount to 0%. In addition, the molding had a standard deviation of gloss values as high as 8.2% so that it had substantial unevenness in delustering. Its average gloss was 48%. The molding was thus inferior to that obtained in Example C-1 in both delustered property and unevenness in delustering.

EXAMPLE C-2

By an extruder, 20 parts by weight of the polymer sample c3 and 80 parts by weight of the polymer sample c5 were molten and kneaded. The sample so obtained was molded at an injection molding temperature of 200° C. As a result of observation of rubber particles in the molding, B particles were found to amount to 48.5%. The molding had a standard deviation of gloss values as low as 3.0% so that it had small unevenness in delustering. Its average gloss was 19%. It therefore indicated excellent delustered property. Measurement results of the molding are shown in Table 8.

EXAMPLE C-3

By an extruder, 90 parts by weight of the polymer sample c1 and 10 parts by weight of the polymer sample c4 were molten and kneaded. The sample so obtained was molded at an injection molding temperature of 240° C. Evaluation results of the molding are shown in Table 8. As a result of observation of rubber particles in the molding, B particles were found to amount to 88.1%. The molding had a standard deviation of gloss values as low as 2.1% so that it had small unevenness in delustering. Its average gloss was 29.0%, thereby indicating an excellent delustered property.

EXAMPLE C-4

By an extruder, 70 parts by weight of the polymer sample c1 and 30 parts by weight of the polymer sample c5 were molten and kneaded. The sample so obtained was molded at an injection molding temperature of 220° C. Evaluation results of the molding are shown in Table 8. As a result of observation of rubber particles in the molding, B particles were found to amount to 77.2%. The molding had a standard deviation of gloss values as low as 2.5%, thereby indicating small unevenness in delustering. It had an average gloss of 31.0%, thereby indicating an excellent delustered property.

TABLE 8

| Item | Unit | Example | | | | Comp. Ex. |
|---|---|---|---|---|---|---|
| | | C-1 | C-2 | C-3 | C-4 | C-1 |
| Polymer sample No. | | 1/2 | 3/5 | 1/4 | 1/5 | Emulsion polymerization |
| Blending ratio | parts by weight | 60/40 | 20/80 | 90/10 | 70/30 | |
| Injection molding temperature | °C. | 210 | 200 | 240 | 220 | 220 |
| Product after blending | | 79.6 | 40.0 | 94.8 | 59.4 | |
| Ratio in product of polymer having greater product to polymer having smaller product | | 1.3 | 2.7 | 4.2 | 2.4 | |
| Average gloss (deluste-property) | % | 20 | 19 | 29 | 31 | 48 |
| Standard deviation of | | 4.2 | 3.0 | 2.1 | 2.5 | 8.2 |

TABLE 8-continued

| Item | Unit | Example C-1 | C-2 | C-3 | C-4 | Comp. Ex. C-1 |
|---|---|---|---|---|---|---|
| gloss (unevenness of delustering) | | | | | | |
| Izod impact strength | kg·cm/cm | 19 | 18 | 17 | 19 | 16 |
| Vicat softening temperature | °C. | 106 | 103 | 104 | 104 | 102 |
| Falling weight impact strength | cm | 88.0 | 81.0 | 81.0 | 85.0 | 82.0 |
| Measurement of rubber particles (Areas of A and B particles) | A particles | 25.7 | 45.3 | 10.5 | 19.5 | 82.0 |
| | B particles % | 62.2 | 48.5 | 88.1 | 77.2 | 0.0 |
| Average particle size of A particles | μm | 1.2 | 1.5 | 1.8 | 1.4 | 1.5 |

EXAMPLE D

Example D describes illustrative production of an ABS-based resin (D) capable of providing a molding which has uniform surface gloss characteristics (high gloss or delustered characteristics) without substantial local variations and also has high impact strength.

EXAMPLE D-1

Prepared was a batch solution consisting of 75.5 parts by weight of styrene, 24.5 parts by weight of acrylonitrile, 15 parts by weight of ethylbenzene, 10 parts by weight of a rubbery polymer (a styrene-butadiene block copolymer having a solution viscosity of 11 cst when measured at 25° C. in the form of a 5 wt. % solution in styrene), 0.04 part by weight of 1,1-bis(t-butylperoxy)- 3,3,5-trimethylcyclohexane] as a organic peroxide and 0.12 part by weight of mercaptane. The solution so obtained was polymerized in the same three-stage, agitated, in-series polymerization tank reactor as that employed in Example O-1. The batch solution so obtained was continuously supplied to the first tank. In the first tank, the degree of agitation and the reaction temperature were set at 250 rpm and 110° C., respectively. The reaction temperature was set at 120° C. in the second tank and 130° C. in the third tank. From the third tank, the polymerization mixture was introduced into the same recovery unit as that employed in Example A.

The polymer was recovered while maintaining constant the average charge amount $FW_{av}$ of the polymerization mixture and setting $FW_{av}$, $FW_{de}$, $NWF_{ch}$ and TF, and the resin temperature [recovery temperature $(T_{av})$], the temperature deviation $(T_{de})$ and the number of hourly temperature fluctuations $(N_{ct})$ at the outlet of the recovery unit as shown in Table 9. The polymer so obtained was granulated by an extruder at a cylinder temperature of 220° C. (also in the other examples and comparative examples, granulation was conducted under similar conditions). The polymer so obtained was molded or formed. Measurement results of physical properties of the molded or formed product are shown in Table 10. According to the results, the molded or formed product had $\alpha_s$ of $1.98 \times 10^{-3}$, $\alpha_m$ of $1.2 \times 10^{-5}$ and $\alpha_m/\alpha_s$ of $6.06 \times 10^{-3}$; an average gloss of 92%, a standard deviation of gloss value of 1.8% and impact strength of 17 kg·cm/cm, thereby indicating small unevenness in gloss and good balance between gloss and impact strength.

EXAMPLE D-2

In a similar manner to Example D-1 except that $FW_{av}$ upon feeding to the recovery unit, $FW_{de}$, $NFW_{ch}$, TF, $T_{av}$, the temperature deviation $(T_{de})$ and the number of hourly temperature fluctuations $(N_{ct})$ were changed according to the conditions shown in Table 9, a polymer was obtained. The polymer so obtained was molded or formed and measurement results of the physical properties of the molded or formed product are shown in Table 10. According to the results, the molded or formed product had $\alpha_s$ of 0.64, $\alpha_m$ of $3 \times 10^{-4}$ and $\alpha_m/\alpha_s$ of $4.71 \times 10^{-4}$; an average gloss of 53%, a standard deviation of gloss value of 3.2% and impact strength of 17 kg·cm/cm, thereby indicating small unevenness in gloss.

EXAMPLE D-3

In a similar manner to Example D-1 except that the amounts of ethylbenzene, the rubbery polymer and mercaptane were increased to 20 parts by weight, 12 parts by weight and 0.15 part by weight, respectively; the degree of agitation and the reaction temperature in the first tank were changed to 200 rpm and 100° C., respectively; and $FW_{av}$, $FW_{de}$, $NFW_{ch}$, TF, $T_{av}$ and $N_{ct}$ upon feeding to the recovery unit were set as shown in Table 9, a polymer was obtained. The polymer so obtained was molded and the measurement results of the physical properties of the molded product are shown in Table 10. According to the results, the molded product had $\alpha_s$ of 4, $\alpha_m$ of $3.3 \times 10^{-4}$ and $\alpha_m/\alpha_s$ of $8.25 \times 10^{-5}$; an average gloss of 25%, a standard deviation of gloss value of 2.3% and impact strength of 18 kg·cm/cm, thereby indicating high delustered property and small unevenness in gloss.

EXAMPLE D-4

Eighty parts by weight of the polymer obtained in Example D-1 and 20 parts by weight of a polycarbonate ("Panlite L-1225", trade name; product of Teijin Chemicals Ltd.; melt flow rate: 10 g/min; Vicat softening temperature: 151° C.) were molten and kneaded, followed by forming or molding. The results of the evaluation of the molded or formed product so obtained are shown in Table 2. According to the results, the molded or formed product had $\alpha_s$ of $4.7 \times 10^{-2}$, $\alpha_m$ of $4.2 \times 10^{-4}$ and $\alpha_m/\alpha_s$ of $8.9 \times 10^{-3}$; an average gloss of 96%, a standard deviation of gloss value of 1.2%, thereby indicating small unevenness in gloss. In addition, it had a Vicat softening temperature of 118° C., thereby indicating high heat resistance.

TABLE 9

| Example | | D-1 | D-2 | D-3 |
|---|---|---|---|---|
| $FW_{av}$ | (liter/min) | 1 | 1 | 1 |
| $FW_{de}$ | (%) | 3 | 21 | 35 |

TABLE 9-continued

| Example | | D-1 | D-2 | D-3 |
|---|---|---|---|---|
| $NFW_{ch}$ | (times) | 2 | 4 | 7 |
| TF | (°C.) | 55 | 70 | 70 |
| $TF \times FW_{dc}$ | | 165 | 1470 | 2450 |
| $FW_{dc} \times NFW_{ch}$ | | 6 | 42 | 175 |
| $T_{av}$ | (°C.) | 245 | 230 | 230 |
| $T_{de}$ | (%) | 1 | 6 | 11 |
| $N_{ct}$ | (times) | 2 | 4 | 7 |
| $T_{de} \times N_{ct}$ | | 2 | 24 | 77 |

TABLE 10

| | | | Example | | |
|---|---|---|---|---|---|
| Item | | Unit | D-1 | D-2 | D-3 |
| Injection molding temperature | | °C. | 210 | 210 | 210 |
| Measurement of rubber particles | Surface layer | | $1.98 \times 10^{-3}$ | 0.64 | 4 |
| | Inner layer | | $1.2 \times 10^{-5}$ | $3.0 \times 10^{-4}$ | $3.3 \times 10^{-4}$ |
| | $\alpha_s/\alpha_m$ | | $6.06 \times 10^{-3}$ | $4.7 \times 10^{-4}$ | $8.25 \times 10^{-5}$ |
| Average rubber particle size | Surface layer | μm | 0.61 | 0.62 | 1.3 |
| | Inner layer | μm | 0.60 | 0.60 | 1.28 |
| Reduced viscosity | Surface layer | | 0.709 | 0.708 | 0.673 |
| | Inner layer | | 0.706 | 0.705 | 0.671 |
| Styrene/acrylonitrile/butadiene | Surface layer | % | 65/21/14 | 65/21/14 | 62/20/18 |
| | Inner layer | % | 65/21/14 | 65/21/14 | 62/20/18 |
| Average gloss | | % | 92 | 53 | 25 |
| Standard deviation of gloss (unevenness of gloss) | | % | 1.8 | 3.2 | 2.3 |
| Izod impact strength | | kg.cm/cm | 17 | 17 | 18 |
| Vicat softening temperature | | °C. | 106 | 106 | 106 |
| Surface quality of molding Streaking | | | Not observed | Not observed | Not observed |

EXAMPLE E

Example E describes illustrative production of ABS-based resins (A), (B) and (C) and evaluation results of the moldings obtained respectively from these resins.

EXAMPLE EA-1

Prepared was a batch solution consisting of 74.5 parts by weight of styrene, 25.5 parts by weight of acrylonitrile, 10 parts by weight of ethylbenzene, 7.4 parts by weight of a rubbery polymer (a styrene-butadiene block copolymer having a solution viscosity of 10 cst when measured at 25° C. in the form of a 5 wt. % solution in styrene), 0.05 part by weight of 1,1-bis(t-butylperoxy)- 3,3,5-trimethylcyclohexane as an organic peroxide and 0.2 part by weight of mercaptane.

The solution so obtained was polymerized in the same three-stage, agitated, in-series polymerization tank reactor as that employed in Example O-1. The batch solution so obtained was continuously supplied to the first tank. The degree of agitation was set at 200 rpm, 100 rpm and 80 rpm in the first, second and third tanks, respectively, while the reaction temperature was set at 105° C., 110° C. and 120° C. in the first, second and third tanks, respectively. The resin temperature ($T_{av}$), the temperature deviation ($T_{de}$) and the number of temperature fluctuations ($N_{ct}$) at the outlet of the recovery unit were adjusted to 230° C., 3% and three times, respectively, whereby a polymer was obtained. The polymer so obtained was molten and kneaded by an extruder and the mass so obtained was injection-molded at a cylinder temperature of 210° C. and a mold temperature of 50° C. Preparation conditions and evaluation results of the molding so obtained are shown in Table 11.

A particles and B particles were found to amount to 71.3% and 0.4%, respectively. Among the A particles, 0.2% of the A particles had a particle size of 1.0–1.5 μm and the average particle size of the A particles was 0.4 μm. The molding has an average gloss of 95%, a standard deviation of gloss values of 3.9%, an Izod impact strength of 17 kg·cm/cm and a Vicat softening temperature of 106° C.

EXAMPLE EA-2

In a similar manner to Example EA-1 except the resin temperature ($T_{av}$), temperature deviation ($T_{de}$) and number of temperature fluctuations at the outlet of the recovery unit were changed to 250° C., 2% and twice, respectively, a molding was obtained. The preparation conditions and evaluation results of the molding are shown in Table 11.

A particles and B particles were found to amount to 78.1 and 0.15%, respectively. Among the A particles, 0.3% of the A particles had a particle size of 1.0–1.5 μm and an average particle size of the A particles was 0.4 μm. The molding had an average gloss of 97%, a standard deviation of gloss values of 3.0%, an Izod impact strength of 18 kg·cm/cm and a Vicat softening temperature of 106° C.

EXAMPLE EB-1

In a similar manner to Example EA-1 except the resin temperature ($T_{av}$), the temperature deviation ($T_{de}$) and the number of temperature fluctuations ($N_{ct}$) at the outlet of the recovery unit were changed to 210° C., 8% and four times, respectively, a molding was obtained. The preparation conditions and evaluation results of the molding are shown in Table 11.

A particles and B particles were found to amount to 41% and 28%, respectively, in the surface of the molding. The A particles had an average particle size of 0.6 μm. The molding has an average falling weight impact of 87 cm, a standard deviation of falling weight impact strength of 18.2 cm, an Izod impact strength of 17 kg·cm/cm and a Vicat softening temperature of 106° C.

EXAMPLE EB-2

In a similar manner to Example EA-1 except the temperature deviation ($T_{de}$) at the outlet of the recovery unit was raised to 6%, a molding was obtained. The preparation conditions and evaluation results of the molding are shown in Table 11.

A particles and B particles were found to amount to 52% and 12%, respectively. The A particles had an average particle size of 0.6 μm. The molding has an average gloss of 26%, a standard deviation of gloss values of 3.8%, an Izod impact strength of 17 kg·cm/cm and a Vicat softening temperature of 106° C.

EXAMPLE EC-1

In a similar manner to Example EA-1 except the temperature deviation ($T_{de}$) and the number of temperature fluctuations ($N_{ct}$) at the outlet of the recovery unit were changed to 5% and 10 times, respectively, a molding was obtained. The preparation conditions and evaluation results of the molding are shown in Table 11.

A particles and B particles were found to amount to 22% and 51%, respectively. The A particles had an average particle size of 0.5 μm. The molding had an average gloss of 26%, a standard deviation of gloss values of 3.8%, an Izod impact strength of 17 kg·cm/cm and a Vicat softening temperature of 106° C.

EXAMPLE EC-2

In a similar manner to Example EA-1 except the resin temperature ($T_{av}$), temperature deviation ($T_{de}$) and number of temperature fluctuations ($N_{ct}$) at the outlet of the recovery unit were changed to 210° C., 10% and 8 times, respectively, a molding was obtained. The preparation conditions and evaluation results of the molding are shown in Table 11.

A particles and B particles were found to amount to 16% and 65%, respectively. The A particles had an average particle size of 0.7 μm. The molding had an average gloss of 35%, a standard deviation of gloss values of 4.9%, an Izod impact strength of 18 kg·cm/cm and a Vicat softening temperature of 106° C.

TABLE 11

|  | EA-1 | EA-2 | EB-1 | EB-2 | EC-1 | EC-2 |
|---|---|---|---|---|---|---|
| Outlet of separation and recovery unit |  |  |  |  |  |  |
| Temp (°C.) | 230 | 250 | 210 | 230 | 230 | 210 |
| Deviation (%) | 3 | 2 | 8 | 6 | 5 | 10 |
| Number of fluctuations (Times) | 3 | 2 | 4 | 3 | 10 | 8 |
| Deviation × Number of fluctuations | 9 | 4 | 32 | 18 | 50 | 80 |
| A particles (%) | 71.3 | 78.1 | 41 | 52 | 22 | 16 |
| Average particle size of A (μm) | 0.4 | 0.4 | 0.6 | 0.5 | 0.6 | 0.7 |
| B particles (%) | 0.4 | 0.15 | 28 | 12 | 51 | 65 |
| Gloss (%) | 95 | 97 |  |  | 26 | 35 |
| Standard deviation of gloss (%) | 3.9 | 3.0 |  |  | 3.8 | 4.9 |
| Falling weight impact strength (cm) |  |  | 87 | 82 |  |  |
| Standard deviation of falling weight impact strength (cm) |  |  | 18.2 | 19.1 |  |  |
| Izod strength (kg.cm/cm) | 17 | 18 | 17 | 17 | 17 | 18 |
| VSP (°C.) | 106 | 106 | 106 | 106 | 106 | 106 |

What is claimed is:

1. A molding of an ABS-based resin, wherein rubber particles located at a depth of 0.5–1.5 μm from a surface of the molding morphologically comprise at least the following two types of particles:
   (1) A particles having an a/b ratio not greater than 1.5, wherein a and b represent a major axis and a minor axis, respectively, and
   (2) B particles having an a/b ratio not smaller than 5, wherein a and b have the same meanings as defined above when a section extending at the depth in parallel with the surface of the molding is observed in an electron micrograph taken by the ultrathin sectioning technique; and assuming that the total area of the rubber particles as observed in the electron micrograph is 100%, the total area of the A particles accounts for at least 10% and that of the B particles is in a range of 0.01–90%.

2. An ABS-based resin capable of affording a molding having A particles and B particles whose total areas fall within their respective ranges specified in claim 1.

3. A molding according to claim 1, wherein the total area of the B particles is in a range of 0.01– 1.0% and the average particle size of the A particles is 0.1–1.5 μm.

4. A molding according to claim 3, wherein the total area of the A particles accounts for at least 10%, the total area of the B particles is in a range of 0.01–1.0%, and the average particle size of the A particles is in a range of 0.1–1.0 μm.

5. An ABS-based resin capable of affording a molding having A particles and B particles whose average particle size and total area fall within their respective ranges specified in claim 3.

6. A molding according to claim 4, wherein the A particles have an average particle size in a range of 0.1–1.0 μm and includes 0.5–5.0% of A particles having a particle size of 1.0–1.5 μm.

7. A molding according to claim 1, wherein the total area of the B particles is in a range greater than 1% but smaller than 40%, and the average particle size of the A particles is 0.1–3 μm.

8. An ABS-based resin capable of affording a molding having A particles and B particles whose average particle size and total area fall within their respective ranges specified in claim 7.

9. A molding according to claim 1, wherein the total area of the B particles is in a range of 40–90% and the average particle size of the A particles is 0.2–5 μm.

10. An ABS-based resin capable of affording a molding having A particles and B particles whose average particle size and total area fall within their respective ranges specified in claim 9.

11. A molding according to claim 1, wherein when a section extending at a depth of at least 200 μm from the surface of the molding in parallel with the surface of the molding is observed in an electron micrograph taken by the ultrathin sectioning technique, the molding satisfies the following equations:

$$1\times 10^{-4} \leq \alpha_s \leq 9$$

$$\alpha_m \leq 1\times 10^{-2}$$

$$\alpha_m/\alpha_s \leq 5\times 10^{-2}$$

wherein a. $\alpha_s$ is $X_1/Y_1$, $X_1$ and $Y_1$ being the percentages of the total areas of the B particles and the A particles, respectively, at the depth of 0.5–1.5 μm when the total area of all the rubber particles at the depth of 0.5–1.5 μm is assumed to be 100%, and b. $\alpha_m$ is $X_2/Y_2$, $X_2$ and $Y_2$ being the percentages of the total areas of B particles and A particles, respectively, at the depth of at least 200 μm when the total area of all the rubber particles at the depth of at least 200 μm is assumed to be 100%.

12. A molding according to claim 11, wherein the resin in a surface layer extending from the surface of the molding to a depth of 100 μm and the resin in an inner layer located at the depth of 200 μm from the surface of the molding and deeper have the same chemical composition, and the difference between the average particle size of rubber particles in the surface layer of the molding and that of rubber particles in the inner layer of the molding as measured by the solution method falls within a range of 0–15%.

13. A molding according to claim 11, wherein $\alpha_s$, $\alpha_m$ and $\alpha_m/\alpha_s$ satisfy the following equations, respectively:

$$1\times 10^{-4} \leq \alpha_s \leq 5$$

$$\alpha_m \leq 5\times 10^{-3}$$

$$\alpha_m/\alpha_s \leq 1\times 10^{-2}.$$

14. A molding according to claim 11, wherein $\alpha_s$, $\alpha_m$ and $\alpha_m/\alpha_s$ satisfy the following equations, respectively:

$$1\times 10^{-4} \leq \alpha_s \leq 0.3$$

$$\alpha_m \leq 5\times 10^{-3}$$

$$\alpha_m/\alpha_s \leq 5\times 10^{-2},$$

and the average particle size of rubber particles in the inner layer as measured by a laser diffraction particle size analyzer in accordance with the solution method is 0.1–1.5 μm.

15. A molding according to claim 11, wherein $\alpha_s$, $\alpha_m$ and $\alpha_m/\alpha_s$ satisfy the following equations, respectively:

$$0.5 \leq \alpha_s \leq 9$$

$$\alpha_m \leq 1\times 10^{-2}$$

$$\alpha_m/\alpha_s \leq 3\times 10^{-2},$$

and the average particle size of rubber particles in the inner layer as measured by a laser diffraction particle size analyzer in accordance with the solution method are both 0.7–3 μm.

16. A molding according to claim 1, wherein the ABS-based resin comprises 10–75 parts by weight of a polycarbonate per 100 parts by weight thereof, and the molding has high heat resistance and is free of unevenness in gloss.

17. A method for controlling the quality of an ABS-based resin, which comprises controlling the quality of the ABS-based resin to provide a molding wherein rubber particles located at a depth of 0.5–1.5 μm from a surface of the molding morphologically comprise at least the following two types of particles:

(1) A particles having an a/b ratio not greater than 1.5, wherein a and b represent a major axis and a minor axis, respectively, and (2) B particles having an a/b ratio not smaller than 5, wherein a and b have the same meanings as defined above when a section extending at the depth in parallel with the surface of the molding is observed in an electron micrograph taken by the ultrathin sectioning technique; and assuming that the total area of the rubber particles as observed in the electron micrograph is 100%, the total area of the A particles accounts for at least 10% and that of the B particles is in a range of 0.01–90%.

18. A method according to claim 17, wherein upon production of an ABS-based resin by a solution or bulk polymerization process comprising (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component, the method comprises setting an outlet temperature of the recovery step in a range of 180°–300° C., and (1) causing the outlet temperature of the recovery step to fluctuate so that the product (F) of a deviation (%) of the outlet temperature and the number of fluctuations of the outlet temperature per hour falls within a range of 0.5–150 or (2) blending at least two kinds of ABS-based resins, which have been obtained by causing the outlet temperature to fluctuate, so that the sum of the products of Fs and blend percentages×1/100 of the individual ABS-based resins falls within the range of 0.5–150.

19. A method according to claim 18, wherein said at least two kinds of ABS-based resins, which have been obtained by causing the outlet temperature to fluctuate, are blended together so that the sum of the products of Fs and blend percentages×1/100 of the individual ABS-based resins falls within the range of 0.5–150, and each of the Fs is the product of a deviation (%) of the outlet temperature and the number of fluctuations of the outlet temperature per hour upon recovery of the corresponding one of the ABS-based resins.

20. A method according to claim 18, wherein (1) the outlet temperature of the recovery step is caused to fluctuate so that the product (F) of a deviation (%) of the outlet temperature and the number of fluctuations of the outlet temperature per hour falls within a range of 0.5–15 or (2) at least two kinds of ABS-based resins, which have been obtained by causing the outlet temperature to fluctuate, are blended together so that the sum of the products of Fs and blend percentages× 1/100 of the individual ABS-based resins falls within the range of 0.5–15.

21. A method according to claim 18, wherein (1) the outlet temperature of the recovery step is caused to fluctuate so that the product (F) of a deviation (%) of the outlet temperature and the number of fluctuations of the outlet temperature per hour falls within a range greater than 15 but not greater than 35 or (2) at least two kinds of ABS-based resins, which have been obtained by causing the outlet temperature to fluctuate, are blended together so that the sum of the products of Fs and blend percentages×1/100 of the individual ABS-based resins falls within a range greater than 15 but not greater than 35.

22. A method according to claim 18, wherein (1) the outlet temperature of the recovery step is caused to fluctuate so that the product (F) of a deviation (%) of the outlet temperature and the number of fluctuations of the outlet temperature per hour falls within a range greater than 35 but not greater than 150 or (2) at least two kinds of ABS-based resins, which have been obtained by causing the outlet temperature to fluctuate, are blended together so that the sum of the products of Fs and blend percentages×1/100 of the individual ABS-based resins falls within the range greater than 35 but not greater than 150.

23. A method according to claim 19, wherein the recovery step is conducted in a recovery unit comprising at least two chambers which are arranged in parallel with each other and are controlled at an outlet temperature in the range of 180°–300° C.

24. A molding according to claim 3, wherein the molding has been obtained by molding an ABS-based resin produced by a solution or bulk polymerization process; the solution or bulk polymerization process comprises (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component; an outlet temperature of the recovery step is set in a range of 180°–300° C.; and (1) the outlet temperature of the recovery step is caused to fluctuate so that the product (F) of a deviation (%) of the outlet temperature and the number of fluctuations of the outlet temperature per hour falls within a range of 0.5–15 or (2) at least two kinds of ABS-based resins, which have been obtained by causing the outlet temperature to fluctuate, are blended together so that the sum of the products of Fs and blend percentages×1/100 of the individual ABS-based resins falls within the range of 0.5–15.

25. A process for the production of an ABS-based resin according to claim 24, wherein the outlet temperature has a deviation of 1–5% and the number of fluctuations of the outlet temperature per hour is 0.5– 15 times.

26. An ABS-based-resin according to claim 24, wherein the resin has been obtained by blending said at least two kinds of ABS-based resins, which have been obtained by causing the outlet temperature to fluctuate, are blended together so that the sum of the products of Fs and blend percentages×1/100 of the individual ABS-based resins falls within the range of 0.5–15.

27. A process for the production of an ABS-based resin according to claim 26, wherein the ratio in product of one of said at least two ABS-based resins, said at least one ABS-based resin having a greatest product of a deviation (%) of its outlet temperature of the recovery step and the number of fluctuations of its outlet temperature per hour, to another ABS-based resin having a smallest product is 1–20.

28. A molding according to claim 7, wherein the molding has been obtained by molding an ABS-based resin produced by a solution or bulk polymerization process; the solution or bulk polymerization process comprises (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component; an outlet temperature of the recovery step is set in a range of 180°–300° C.; and (1) the outlet temperature of the recovery step is caused to fluctuate so that the product (F) of a deviation (%) of the outlet temperature and the number of fluctuations of the outlet temperature per hour falls within a range greater than 15 but not greater than 35 or (2) at least two kinds of ABS-based resins, which have been obtained by causing the outlet temperature to fluctuate, are blended together so that the sum of the products of Fs and blend percentages×1/100 of the individual ABS-based resins falls within the range greater than 15 but not greater than 35.

29. A process for the production of an ABS-based resin according to claim 28, wherein the outlet temperature has a deviation of 3–10% and the number of fluctuations of the outlet temperature per hour is 5–15 times.

30. An ABS-based resin according to claim 28, wherein the resin has been obtained by blending said at least two kinds of ABS-based resins, which have been obtained by causing the outlet temperature to fluctuate, are blended together so that the sum of the products of Fs and blend percentages×1/100 of the individual ABS-based resins falls within the range greater than 15 but not greater than 35.

31. A process for the production of an ABS-based resin according to claim 30, wherein the ratio in product of one of said at least two ABS-based resins, said at least one ABS-based resin having a greatest product of a deviation (%) of its outlet temperature of the recovery step and the number of fluctuations of its outlet temperature per hour, to another ABS-based resin having a smallest product is 1–20.

32. A molding according to claim 9, wherein the molding has been obtained by molding an ABS-based resin produced by a solution or bulk polymerization process; the solution or bulk polymerization process comprises (i) a polymerization step of feeding raw materials composed of at least a styrene monomer, an acrylonitrile monomer and a rubbery polymer obtained by the solution polymerization process and then polymerizing at least portions of the monomers while forming rubber particles and (ii) a recovery step of heating the resulting polymerization mixture composed of a polymer so obtained and unreacted monomers and optionally, a solvent, and at the same time as the heating or subsequent to the heating, introducing the polymerization mixture into a vacuum chamber to separate the unreacted monomers and, where the solvent is contained, the solvent from a resin component; an outlet temperature of the recovery step is set in a range of 180°–300° C.; and (1) the outlet temperature of the recovery step is caused to fluctuate so that the product (F) of a deviation (%) of the outlet temperature and the number of fluctuations of the outlet temperature per hour falls within a range greater than 35 but not greater than 150 or (2) at least two kinds of ABS-based resins, which have been obtained by causing the outlet temperature to fluctuate, are blended together so that the sum of the products of Fs and blend percentages×1/100 of the individual ABS-based resins falls within the range greater than 35 but not greater than 150.

33. A process for the production of an ABS-based resin according to claim 32, wherein the outlet temperature has a deviation of 3–15% and the number of fluctuations of the outlet temperature per hour is 11–33 times.

34. An ABS-based resin according to claim 32, wherein the resin has been obtained by blending said at least two kinds of ABS-based resins, which have been obtained by causing the outlet temperature to fluctuate, are blended together so that the sum of the products of Fs and blend percentages×1/100 of the individual ABS-based resins falls within the range greater than 35 but not greater than 150.

35. A process for the production of an ABS-based resin according to claim 34, wherein the ratio in product of one of said at least two ABS-based resins, said at least one ABS-based resin having a greatest product of a deviation (%) of its outlet temperature of the recovery step and the number of fluctuations of its outlet temperature per hour, to another ABS-based resin having a smallest product is 1–20.

* * * * *